United States Patent [19]

Tennant et al.

[11] Patent Number: 4,829,423
[45] Date of Patent: May 9, 1989

[54] MENU-BASED NATURAL LANGUAGE UNDERSTANDING SYSTEM

[75] Inventors: Harry R. Tennant, Garland; Kenneth M. Ross, Bedford; Richard M. Saenz, Dallas; Craig W. Thompson, James R. Miller; both of Plano, all of Tex.

[73] Assignee: Texas Instruments Incorporated, Dallas, Tex.

[21] Appl. No.: 35,276

[22] Filed: Apr. 3, 1987

Related U.S. Application Data

[63] Continuation of Ser. No. 898,875, Aug. 21, 1986, abandoned, which is a continuation of Ser. No. 462,151, Jan. 28, 1983, abandoned.

[51] Int. Cl.$^4$ ............................................. G06F 1/00
[52] U.S. Cl. .................................. 364/200; 364/286.2
[58] Field of Search ... 364/200 MS File, 900 MS File, 364/300

[56] References Cited

U.S. PATENT DOCUMENTS

| | | | |
|---|---|---|---|
| 3,566,370 | 2/1971 | Worthington et al. | 364/900 |
| 4,177,514 | 12/1979 | Rupp | 364/200 |
| 4,460,975 | 7/1984 | Torkelsen et al. | 364/900 |

OTHER PUBLICATIONS

1982 International Zurich Seminar On Digital Communications, Man-Machine Interaction, 9th-11th Mar. 1982, Zurich, *Proceedings, IEEE,* Cat. No. 82CH1735-D, pp. 153-158, H. G. Fischer et al. "User Friendly Interaction with an Integrated Database Information Retrieval System".
*Computer,* vol. 13, No. 7, Jul. 1980, pp. 43-48, Fox et al, "The Automated Dictionary".
*IEEE Trans. On Pattern Analysis and Machine Intelligence,* vol. PAMI-4, No. 2, Mar. 1982, pp. 221-223, J. W. Smith et al., "A Microcomputer System for Processing Natural Languages".
*Philips Technical Review,* vol. 38, No. 10, 1978/79, pp. 269-284, "Phliqa 1, A Question-Answering System For Data-Answering System For Data-Base Consulation in Natural English".

*Primary Examiner*—Raulfe B. Zache
*Attorney, Agent, or Firm*—Kenneth C. Hill; James T. Comfort; Melvin Sharp

[57] ABSTRACT

A natural language interface for a computer system restricts inputs from a user to those which generate valid input sentences. The user selects a next input word from a menu showing which words are valid. When an input is selected, a parser uses a predefined grammar to determine which words are valid continuations after the selected word, and whether a complete sentence has been entered. Valid next words are presented to the user in menu form so that a next selection can be made. If an ambiguous complete sentence is entered, the interface allows the user to select the desired meaning therefor. The grammer can be context free grammar, and can use an associated lexicon to define elements therein.

54 Claims, 16 Drawing Sheets

| actions | nouns | attributes | modifiers |
|---|---|---|---|
| Find        Delete | batters | (specific batter names) | whose batter name is |
| Insert | pitchers | (specific batter leagues) | whose batter league is |
| | teams | (specific batter teams) | whose batter team is |
| features | (specific batters) | (specific pitcher names) | whose pitcher name is |
| batting average | (specific pitchers) | (specific pitcher leagues) | whose pitcher league is |
| games played | (specific teams) | (specific pitcher teams) | whose pitcher team is |
| at bats | (a new batter) | (specific team names) | whose team name is |
| runs | (a new pitcher) | (specific team leagues) | whose team league is |
| hits | (a new team) | (specific number) | whose individual batting average is |
| doubles | | | whose batter games played is |
| triples | | | whose batter at bats is |
| homeruns | | | whose batter runs is |
| RBIs | comparisons | | whose batter hits is |
| steals | between | | whose batter doubles is |
| wins | greater than | | whose batter triples is |
| losses | less than | | whose batter homeruns is |
| ERA | greater than or equal to | | whose batter RBIs is |
| games pitched | less than or equal to | operators | whose batter steals is |
| complete games | equal to | the number of        of | whose pitcher wins is |
| innings pitched | | and                          or | whose pitcher losses is |
| hits given up | | (                                ) | whose pitcher ERA is |
| walks | | the average    the total | whose pitcher games pitched is |
| strikeouts | | | whose pitcher complete games is |
| shutouts | | | whose pitcher innings pitched is |
| saves | | | whose pitcher hits given up is |

NLMENU interface Baseball demo—(Version LM2)

commands

| Re-start | Rubout | | | Exit system |
|---|---|---|---|---|
| Refresh | Save Q | Retrieve Q | Delete Q | Play Q |

Query

Number of parses: 1

(PRINTREL (RETRIEVE 'BATTER WHERE (GT HOMERUNS 25) GIVING BATTER-9) *OUTPUT-WINDOW*)

Display window

*Fig. 1*

| NLMENU interface Baseball demo—(Version LM2) | | | |
|---|---|---|---|
| actions | nouns | attributes | modifiers |
| Find          Delete | batters | (specific batter names) | whose batter name is |
| Insert | pitchers | (specific batter leagues) | whose batter league is |
|  | teams | (specific batter teams) | whose batter team is |
| features | (specific batters) | (specific pitcher names) | whose pitcher name is |
| name X | (specific pitchers) | (specific pitcher leagues) | whose pitcher league is |
| league | (specific teams) | (specific pitcher teams) | whose pitcher team is |
| batting average |  | (specific team names) | whose team name is |
| games played |  | (specific team leagues) | whose team league is |
| at bats |  | (specific number) | whose individual batting average is |
| runs |  |  | whose batter games played is |
| hits |  |  | whose batter at bats is |
| doubles |  |  | whose batter runs is |
| triples | comparisons |  | whose batter hits is |
| homeruns | between |  | whose batter doubles is |
| RBIs | greater than |  | whose batter triples is |
| steals | less than |  | whose batter homeruns is |
| wins | greater than or equal to |  | whose batter RBIs is |
| losses | less than or equal to |  | whose batter steals is |
| ERA | equal to |  | whose pitcher wins is |
| games pitched |  | operators | whose pitcher losses is |
| complete games |  | the number of | whose pitcher ERA is |
| innings pitched |  | the average | whose pitcher games pitched is |
| hits given up |  | the total | whose pitcher complete games is |
| walks |  |  | whose pitcher innings pitched is |
|  |  |  | whose pitcher hits given up is |

| commands | | | | |
|---|---|---|---|---|
| Re-start | Rubout |  |  | Exit system |
| Refresh | Save Q | Retrieve Q | Delete Q | Play Q |

Find ∎

Query

Number of parses: 1

(PRINTREL (RETRIEVE 'BATTER WHERE (GT HOMERUNS 25) GIVING BATTER-9) *OUTPUT-WINDOW*)

Display window

*Fig. 2*

| NLMENU interface Baseball demo—(Version LM2) | | | |
|---|---|---|---|
| actions | nouns | attributes | modifiers |
| Find　　Delete | batters | (specific batter names) | whose batter name is |
| Insert | pitchers | (specific batter leagues) | whose batter league is |
| | teams | (specific batter teams) | X [ whose batter team is ] |
| features | (specific batters) | (specific pitcher names) | whose individual batting average is |
| batting average | (specific pitchers) | (specific pitcher leagues) | whose batter games played is |
| games played | (specific teams) | (specific pitcher teams) | whose batter at bats is |
| at bats | (a new batter) | (specific team names) | whose batter runs is |
| runs | (a new pitcher) | (specific team leagues) | whose batter hits is |
| hits | (a new team) | (specific number) | whose batter doubles is |
| doubles | | | whose batter triples is |
| triples | | | whose batter homeruns is |
| homeruns | | | whose batter RBIs is |
| RBIs | comparisons | | whose batter steals is |
| steals | between | | who are on |
| wins | greater than | | |
| losses | less than | | |
| ERA | greater than or equal to | | |
| games pitched | less than or equal to | operators | |
| complete games | equal to | ( | |
| innings pitched | | | |
| hits given up | | | |
| walks | | | |
| strikeouts | | | |
| shutouts | | | |
| saves | | | |
| commands | | | | |
|---|---|---|---|---|
| Re-start | Rubout | | | Exit system |
| Refresh | Save Q | Retrieve Q | Delete Q | Play Q |

Find name and league of batters ( ▌

Query

Number of parses: 1

(PRINTREL (RETRIEVE BATTER WHERE (GT HOMERUNS 25) GIVING BATTER-9) *OUTPUT-WINDOW*) ▌

Display window

*Fig. 3*

| NLMENU interface Baseball demo—(Version LM2) | | | |
|---|---|---|---|
| actions | nouns | attributes | modifiers |
| Find　　Delete | batters | (specific batter names) x | whose batter name is |
| Insert | pitchers | | whose batter league is |
| | teams | x | whose batter team is |
| features | (specific batters) | | whose pitcher name is |
| batting average | (specific pitchers) | | whose pitcher league is |
| games played | (specific teams) | | whose pitcher team is |
| at bats | (a new batter) | | whose team name is |
| runs | (a new pitcher) | | whose team league is |
| hits | (a new team) | | whose individual batting average is |
| doubles | | | whose batter games played is |
| triples | | | whose batter at bats is |
| homeruns | | | whose batter runs is |
| RBIs | comparisons | | whose batter hits is |
| steals | between | | whose batter doubles is |
| wins | greater than | | whose batter triples is |
| losses | less than | | whose batter homeruns is |
| ERA | greater than or equal to | | whose batter RBIs is |
| games pitched | less than or equal to | operators | whose batter steals is |
| complete games | equal to | the number of　　of | whose pitcher wins is |
| innings pitched | | and　　or | whose pitcher losses is |
| hits given up | | (　　) | whose pitcher ERA is |
| walks | | the average　the total | whose pitcher games pitched is |
| strikeouts | | | whose pitcher complete games is |
| shutouts | | | whose pitcher innings pitched is |
| saves | | | whose pitcher hits given up is |
| commands | | | | |
|---|---|---|---|---|
| Re-start | Rubout | | | Exit system |
| Refresh | Save Q | Retrieve Q | Delete Q | Play Q |

Find name and league of batters (whose batter team is ■

Query

Number of parses: 1

(PRINTREL (RETRIEVE 'BATTER WHERE (GT HOMERUNS 25) GIVING BATTER-9) *OUTPUT-WINDOW*)

Display window

*Fig. 4*

| NLMENU interface Baseball demo—(Version LM2) | | | |
|---|---|---|---|
| actions | nouns | | modifiers |
| Find　　Delete | batters | Select BATTER | whose batter name is |
| Insert | pitchers | Abort | whose batter league is |
| | teams | Do it | whose batter team is |
| features | (specific batters) | × | whose pitcher name is |
| batting average | (specific pitchers) | HOUSTON | whose pitcher league is |
| games played | (specific teams) | TEXAS | whose pitcher team is |
| at bats | (a new batter) | | whose team name is |
| runs | (a new pitcher) | | whose team league is |
| hits | (a new team) | | whose individual batting average is |
| doubles | | | whose batter games played is |
| triples | | | whose batter at bats is |
| homeruns | | | whose batter runs is |
| RBIs | comparisons | | whose batter hits is |
| steals | between | | whose batter doubles is |
| wins | greater than | | whose batter triples is |
| losses | less than | | whose batter homeruns is |
| ERA | greater than or equal to | | whose batter RBIs is |
| games pitched | less than or equal to | operators | whose batter steals is |
| complete games | equal to | the number of　　of | whose pitcher wins is |
| innings pitched | | and　　or | whose pitcher losses is |
| hits given up | | (　　　　) | whose pitcher ERA is |
| walks | | the average　the total | whose pitcher games pitched is |
| strikeouts | | | whose pitcher complete games is |
| shutouts | | | whose pitcher innings pitched is |
| saves | | | whose pitcher hits given up is |

| commands | | | | |
|---|---|---|---|---|
| Re-start | Rubout | | | Exit system |
| Refresh | Save Q | Retrieve Q | Delete Q | Play Q |

Find name and league of batters (whose batter team is

Query

Number of parses: 1

(PRINTREL (RETRIEVE 'BATTER WHERE (GT HOMERUNS 25) GIVING BATTER-9) "OUTPUT-WINDOW")

Display window

*Fig. 5*

| \multicolumn{4}{l}{NLMENU interface Baseball demo—(Version LM2)} |
|---|---|---|---|
| actions | nouns | attributes | modifiers |
| Find  Delete | batters | (specific batter names) | whose batter name is |
| Insert | pitchers | (specific batter leagues) | whose batter league is |
|  | teams | (specific batter teams) | whose batter team is |
| features | (specific batters) | (specific pitcher names) | whose pitcher name is |
| batting average | (specific pitchers) | (specific pitcher leagues) | whose pitcher league is |
| games played | (specific teams) | (specific pitcher teams) | whose pitcher team is |
| at bats | (a new batter) | (specific team names) | whose team name is |
| runs | (a new pitcher) | (specific team leagues) | whose team league is |
| hits | (a new team) | (specific number) | whose individual batting average is |
| doubles |  |  | whose batter games played is |
| triples |  |  | whose batter at bats is |
| homeruns |  |  | whose batter runs is |
| RBIs | comparisons |  | whose batter hits is |
| steals | between |  | whose batter doubles is |
| wins | greater than |  | whose batter triples is |
| losses | less than |  | whose batter homeruns is |
| ERA | greater than or equal to |  | whose batter RBIs is |
| games pitched | less than or equal to | operators | whose batter steals is |
| complete games | equal to | and | whose pitcher wins is |
| innings pitched |  | or  X | whose pitcher losses is |
| hits given up |  | ) | whose pitcher ERA is |
| walks |  |  | whose pitcher games pitched is |
| strikeouts |  |  | whose pitcher complete games is |
| shutouts |  |  | whose pitcher innings pitched is |
| saves |  |  | whose pitcher hits given up is | commands

| Re-start | Rubout |  |  | Exit system |
|---|---|---|---|---|
| Refresh | Save Q | Retrieve Q | Delete Q | Play Q |

Find name and league of batters (whose batter team is HOUSTON ■

Query

Number of parses: 1

(PRINTREL (RETRIEVE BATTER WHERE (GT HOMERUNS 25) GIVING BATTER-9) *OUTPUT-WINDOW*)

Display window

*Fig. 6*

| NLMENU interface Baseball demo—(Version LM2) | | | |
|---|---|---|---|
| actions | nouns | attributes | modifiers |
| Find      Delete | batters | (specific batter names) | whose batter name is |
| Insert | pitchers | (specific batter leagues) | whose batter league is |
|  | teams | (specific batter teams) | whose batter team is |
| features | (specific batters) | (specific pitcher names) | whose pitcher name is |
| batting average | (specific pitchers) | (specific pitcher leagues) | whose pitcher league is |
| games played | (specific teams) | (specific pitcher teams) | whose pitcher team is |
| at bats | (a new batter) | (specific team names) | whose team name is |
| runs | (a new pitcher) | (specific team leagues) | whose team league is |
| hits | (a new team) | (specific number) | whose individual batting average is |
| doubles |  |  | whose batter games played is |
| triples |  |  | whose batter at bats is |
| homeruns |  |  | whose batter runs is |
| RBIs | comparisons |  | whose batter hits is |
| steals | between |  | whose batter doubles is |
| wins | greater than   X |  | whose batter triples is |
| losses | less than |  | whose batter RBIs is |
| ERA | greater than or equal to |  | whose batter homeruns is |
| games pitched | less than or equal to | operators | whose batter steals is |
| complete games | equal to | the number of      of | whose pitcher wins is |
| innings pitched |  | and      or | whose pitcher losses is |
| hits given up |  | (      ) | whose pitcher ERA is |
| walks |  | the average   the total | whose pitcher games pitched is |
| strikeouts |  |  | whose pitcher complete games is |
| shutouts |  |  | whose pitcher innings pitched is |
| saves |  |  | whose pitcher hits given up is |

| commands | | | | |
|---|---|---|---|---|
| Re-start | Rubout |  |  | Exit system |
| Refresh | Save Q | Retrieve Q | Delete Q | Play Q |

Find name and league of batters (whose batter team is HOUSTON or whose individual batting average is ▌

Query

Number of parses: 1

(PRINTREL (RETRIEVE 'BATTER WHERE (GT HOMERUNS 25) GIVING BATTER-9) "OUTPUT-WINDOW") ▌

Display window

*Fig. 7*

| NLMENU interface Baseball demo—(Version LM2) | | | |
|---|---|---|---|
| actions | nouns | attributes | modifiers |
| Find  Delete | 1250 | | whose batter name is |
| Insert | 7  8  9  rubout | | whose batter league is |
| | 4  5  6  clear | | whose batter team is |
| features | (spe  1  2  3  X | | whose pitcher name is |
| batting average | (spe         return | | whose pitcher league is |
| games played | (spe •  0  −  abort | | whose pitcher team is |
| at bats | (a new batter) | | whose team name is |
| runs | (a new pitcher) | | whose team league is |
| hits | (a new team) | | whose individual batting average is |
| doubles | | | whose batter games played is |
| triples | | | whose batter at bats is |
| homeruns | | | whose batter runs is |
| RBIs | comparisons | | whose batter hits is |
| steals | between | | whose batter doubles is |
| wins | greater than | | whose batter triples is |
| losses | less than | | whose batter homeruns is |
| ERA | greater than or equal to | | whose batter RBIs is |
| games pitched | less than or equal to | operators | whose batter steals is |
| complete games | equal to | the number of | whose pitcher wins is |
| innings pitched | | the average | whose pitcher losses is |
| hits given up | | the total | whose pitcher ERA is |
| walks | | | whose pitcher games pitched is |
| strikeouts | | | whose pitcher complete games is |
| shutouts | | | whose pitcher innings pitched is |
| saves | | | whose pitcher hits given up is | commands

| Re-start | Rubout | | | Exit system |
|---|---|---|---|---|
| Refresh | Save Q | Retrieve Q | Delete Q | Play Q |

Find name and league of batters (whose batter team is HOUSTON or whose individual batting average is greater than ▌

Query

Number of parses: 1

(PRINTREL (RETRIEVE 'BATTER WHERE (GT HOMERUNS 25) GIVING BATTER-9) "OUTPUT-WINDOW")

Display window

*Fig. 8*

| NLMENU interface Baseball demo—(Version LM2) | | | |
|---|---|---|---|
| actions | nouns | attributes | modifiers |
| Find    Delete | batters | (specific batter names) | whose batter name is |
| Insert | pitchers | (specific batter leagues) | whose batter league is |
|  | teams | (specific batter teams) | whose batter team is |
| features | (specific batters) | (specific pitcher names) | whose pitcher name is |
| batting average | (specific pitchers) | (specific pitcher leagues) | whose pitcher league is |
| games played | (specific teams) | (specific pitcher teams) | whose pitcher team is |
| at bats | (a new batter) | (specific team names) | whose team name is |
| runs | (a new pitcher) | (specific team leagues) | whose team league is |
| hits | (a new team) | (specific number) | whose individual batting average is |
| doubles |  |  | whose batter games played is |
| triples |  |  | whose batter at bats is |
| homeruns |  |  | whose batter runs is |
| RBIs | comparisons |  | whose batter hits is |
| steals | between |  | whose batter doubles is |
| wins | greater than |  | whose batter triples is |
| losses | less than |  | whose batter homeruns is |
| ERA | greater than or equal to |  | whose batter RBIs is |
| games pitched | less than or equal to | operators | whose batter steals is |
| complete games | equal to | and | whose pitcher wins is |
| innings pitched |  | or | whose pitcher losses is |
| hits given up |  |  | whose pitcher ERA is |
| walks |  | X | whose pitcher games pitched is |
| strikeouts |  |  | whose pitcher complete games is |
| shutouts |  |  | whose pitcher innings pitched is |
| saves |  |  | whose pitcher hits given up is | commands

| Re-start | Rubout | | | Exit system |
|---|---|---|---|---|
| Refresh | Save Q | Retrieve Q | Delete Q | Play Q |

Find name and league of batters (whose batter team is HOUSTON or whose individual batting average is greater than 0.25 ∎

Query

Number of parses: 1

(PRINTREL (RETRIEVE 'BATTER WHERE (GT HOMERUNS 25) GIVING BATTER-9) 'OUTPUT-WINDOW')

Display window

*Fig. 9*

| NLMENU interface Baseball demo—(Version LM2) | | | |
|---|---|---|---|
| actions | nouns | attributes | modifiers |
| Find    Delete | batters | (specific batter names) | whose batter name is |
| Insert | pitchers | (specific batter leagues) | whose batter league is |
|  | teams | (specific batter teams) | whose batter team is |
| features | (specific batters) | (specific pitcher names) | whose pitcher name is |
| batting average | (specific pitchers) | (specific pitcher leagues) | whose pitcher league is |
| games played | (specific teams) | (specific pitcher teams) | whose pitcher team is |
| at bats | (a new batter) | (specific team names) | whose team name is |
| runs | (a new pitcher) | (specific team leagues) | whose team league is |
| hits | (a new team) | (specific number) | whose individual batting average is |
| doubles |  |  | whose batter games played is |
| triples |  |  | whose batter at bats is |
| homeruns |  |  | whose batter runs is |
| RBIs | comparisons |  | whose batter hits is |
| steals | between |  | whose batter doubles is |
| wins | greater than |  | whose batter triples is |
| losses | less than |  | whose batter homeruns is |
| ERA | greater than or equal to |  | whose batter RBIs is |
| games pitched | less than or equal to | operators | whose batter steals is |
| complete games | equal to | and | whose pitcher wins is |
| innings pitched |  | or | whose pitcher losses is |
| hits given up |  |  | whose pitcher ERA is |
| walks |  |  | whose pitcher games pitched is |
| strikeouts |  |  | whose pitcher complete games is |
| shutouts |  |  | whose pitcher innings pitched is |
| saves |  |  | whose pitcher hits given up is |

| commands | | | | |
|---|---|---|---|---|
| Re-start | Rubout | Show query | Execute | Exit system |
| Refresh | Save Q | Retrieve Q | Dlt. Q's | Play Q |

Find name and league of batters (whose batter team is HOUSTON or whose individual batting average is greater than 0.25)or whose batter steals is less than 10∎

Query

```
DB: RELATION BATTER-12—(cardinality 40)
----------------------
|NAME       |LEAGUE   |
|ASHBY      |N        |
|B. JOHNSON |A        |
|BASS       |A        |
|BELL       |A        |
|BOGENER    |A        |
|CAPRA      |A        |
|CRUZ       |N        |
|DENT       |A        |
|DORAN      |N        |
|FLYNN      |A        |
|GARCIA     |N        |
|GARNER     |N        |
|GRUBB      |A        |
|HEEP       |N        |
|HOSTETLER  |A        |
|HOWE       |N        |
|IVIE       |N        |
|KNIGHT     |N        |
MORE
```

Display window

*Fig.10*

| NLMENU interface Baseball demo—(Version LM2) | | | |
|---|---|---|---|
| actions | nouns | attributes | modifiers |
| Find     Delete | batters | (specific batter names) | whose batter name is |
| Insert | pitchers | (specific batter leagues) | whose batter league is |
| | teams | (specific batter teams) | whose batter team is |
| features | (specific batters) | (specific pitcher names) | whose pitcher name is |
| batting average | (specific pitchers) | (specific pitcher leagues) | whose pitcher league is |
| games played | (specific teams) | (specific pitcher teams) | whose pitcher team is |
| at bats | (a new batter) | (specific team names) | whose team name is |
| runs | (a new pitcher) | (specific team leagues) | whose team league is |
| hits | (a new team) | (specific number) | whose individual batting average is |
| doubles | | | whose batter games played is |
| triples | | | whose batter at bats is |
| homeruns | | | whose batter runs is |
| RBIs | comparisons | | whose batter hits is |
| steals | between | | whose batter doubles is |
| wins | greater than | | whose batter triples is |
| losses | less than | | whose batter homeruns is |
| ERA | greater than or equal to | | whose batter RBIs is |
| games pitched | less than or equal to | operators | whose batter steals is |
| complete games | equal to | and | whose pitcher wins is |
| innings pitched | | or | whose pitcher losses is |
| hits given up | | | whose pitcher ERA is |
| walks | | | whose pitcher games pitched is |
| strikeouts | | | whose pitcher complete games is |
| shutouts | | | whose pitcher innings pitched is |
| saves | | | whose pitcher hits given up is |

| commands | | | | |
|---|---|---|---|---|
| Re-start | Rubout | Show query | Execute | Exit system |
| Refresh | Save Q | Retrieve Q | Dlt. Q's | Play Q |

Find name and league of batters (whose batter team is HOUSTON or whose individual batting average is greater than 0.25) or whose batter steals is greater than 10 ∎

Query

```
Number of parses: 1
(PRINTREL (RETRIEVE 'BATTER
            WHERE
            (OR (OR (MEM 'EDU-DB TEAM' (HOUSTON))
                    (GT AVERAGE 0.25))
                    (GT STEALS 10))
            OVER
            (NAME LEAGUE)
            GIVING
            BATTER-10)
        'OUTPUT-WINDOW') ∎
```

Display window

*Fig.11*

| actions | nouns | attributes | modifiers |
|---|---|---|---|
| Find　　Delete | batters | (specific batter names) | whose batter name is |
| Insert | pitchers | (specific batter leagues) | whose batter league is |
| | teams | (specific batter teams) | whose batter team is |
| features | (specific batters) | (specific pitcher names) | whose pitcher name is |
| batting average | (specific pitchers) | (specific pitcher leagues) | whose pitcher league is |
| games played | (specific teams) | (specific pitcher teams) | whose pitcher team is |
| at bats | (a new batter) | (specific team names) | whose team name is |
| runs | (a new pitcher) | (specific team leagues) | whose team league is |
| hits | (a new team) | (specific number) | whose individual batting average is |
| doubles | | | whose batter games played is |
| triples | | | whose batter at bats is |
| homeruns | | | whose batter runs is |
| RBIs | comparisons | | whose batter hits is |
| steals | between | | whose batter doubles is |
| wins | greater than | | whose batter triples is |
| losses | less than | | whose batter homeruns is |
| ERA | greater than or equal to | | whose batter RBIs is |
| games pitched | less than or equal to | operators | whose batter steals is |
| complete games | equal to | and | whose pitcher wins is |
| innings pitched | | or | whose pitcher losses is |
| hits given up | | | whose pitcher ERA is |
| walks | | | whose pitcher games pitched is |
| strikeouts | | | whose pitcher complete games is |
| shutouts | | | whose pitcher innings pitched is |
| saves | | | given up is |

NLMENU interface Baseball demo—(Version LM2)

```
Show all 49 lines?
  YES - show all lines
  NO- flush remaining lines
``` commands

Re-start　　Rubout　　　　　　　　　　　　　it system
Refresh　　Save Q　　　　　　　　　　　　　Play Q

Find name and league of batters (whose batter team is HOUSTON or whose individual batting average is greater than 0.25) or whose batter steals is less than 10)

Query

DB: RELATION BATTER-12—(cardinality 40)

```
NAME          LEGUE
I ASHBY        N
I B. JOHNSON   A
I BASS         A
I BELL         A
I BOGENER      A
I CAPRA        A
I CRUZ         N
I DENT         A
I DORAN        N
I FLYNN        A
I GARCIA       N
I GARNER       N
I GRUBB        A
I HEEP         N
I HOSTETLER    A
I HOWE         N
I IVIE         N
I KNIGHT       N
```

Display window

*Fig. 12*

| NLMENU interface Baseball demo—(Version LM2) | | | |
|---|---|---|---|
| actions | nouns | attributes | modifiers |
| Find     Delete<br>Insert<br><br>features<br>batting average<br>games played<br>at bats<br>runs<br>hits<br>doubles<br>triples<br>homeruns<br>RBIs<br>steals<br>wins<br>losses<br>ERA<br>games pitched<br>complete games<br>innings pitched<br>hits given up<br>walks<br>strikeouts<br>shutouts<br>saves | batters<br>pitchers<br>teams<br>(specific batters)<br>(specific pitchers)<br>(specific teams)<br>(a new batter)<br>(a new pitcher)<br>(a new team)<br><br>comparisons<br>between<br>greater than<br>less than<br>greater than or equal to<br>less than or equal to<br>equal to | (specific batter names)<br>(specific batter leagues)<br>(specific batter teams)<br>(specific pitcher names)<br>(specific pitcher leagues)<br>(specific pitcher teams)<br>(specific team names)<br>(specific team leagues)<br>(specific number)<br><br><br><br><br><br><br><br>operators<br>and<br>or | whose batter name is<br>whose batter league is<br>whose batter team is<br>whose pitcher name is<br>whose pitcher league is<br>whose pitcher team is<br>whose team name is<br>whose team league is<br>whose individual batting average is<br>whose batter games played is<br>whose batter at bats is<br>whose batter runs is<br>whose batter hits is<br>whose batter doubles is<br>whose batter triples is<br>whose batter homeruns is<br>whose batter RBIs is<br>whose batter steals is<br>whose pitcher wins is<br>whose pitcher losses is<br>whose pitcher ERA is<br>whose pitcher games pitched is<br>whose pitcher complete games is<br>whose pitcher innings pitched is<br>whose pitcher hits given up is |
| commands | | | |
| Re-start     Rubout     Show query     X Execute     Exit system<br>Refresh     Save Q     Retrieve Q     Dlt. Q's     Play Q | | | |
| Find batters who are on teams that have batters whose batter league is N and whose individual batting average is greater than 0.283 ■<br><br>Query | | | |
| <br><br><br><br><br><br><br><br><br>Display window | | | |

*Fig. 13*

| NLMENU interface Baseball demo—(Version LM2) | | | |
|---|---|---|---|
| actions | nouns | attributes | modifiers |

Find   Delete
Insert features
- batting average
- games played
- at bats
- runs
- hits
- doubles
- triples
- homeruns
- RBIs
- steals
- wins
- losses
- ERA
- games pitched
- complete games
- innings pitched
- hits given up
- walks
- strikeouts
- shutouts
- saves commands
Re-start   R
Refresh   S

Find batters who are
and whose individual

Query

Execution completed.
DB:RELATION BATTER-14

*(middle column partial:)* (s, (s, (s, (, (, comp, great, less

Help window:
Move mouse away from this window when done.

You are asking for help on the and item in the OPERATORS menu.
This item has no help message.
After you select this, you will be able to choose from:

Items in the MODIFIERS menu:
- whose batter name is
- whose batter league is
- whose batter team is
- whose team name is
- whose team league is
- whose individual batting average is
- whose batter games played is
- whose batter at bats is
- whose batter runs is
- whose batter hits is
- whose batter doubles is
- whose batter triples is
- whose batter homeruns is
- whose batter RBIs is
- whose batter steals is
- whose team batting average is
- whose team games played is
- whose team at bats is
- whose team runs scored is
- whose team hits gotten is
- whose team doubles is
- whose team triples is
- whose team homeruns is
- whose team steals is
- whose team shut out by others is
- whose team ERA is
- whose team complete games is
- whose team innings pitched is
- whose team hits given up is
- whose team runs given up is
- whose team walks given up is
- whose team strikeouts recorded is
- whose team shutouts pitched is
- whose team saves is
- that have
- who are on Items in the OPERATORS menu:

NAME
MES_PLAYED|AT_BATS|RUN

| ASHBY | | | | IN | | HOUSTON | | | |
|---|---|---|---|---|---|---|---|---|---|
| 0 | 339 | 40 | 87 | 14 | | HOUSTON | 0.275 | | 15 |
| CRUZ | | | | IN | | | | | |
| 5 | 570 | 62 | 157 | 127 | 2 | 9 68 21 | 0.278 | | 26 |
| DORAN | | | | IN | | HOUSTON | | | |
| 97 | 11 | 27 | 3 | 0 | 0 | 6 5 | 0.211 | | 34 |
| GARCIA | | | | IN | | HOUSTON | | | |
| 76 | 5 | 116 | 5 | 0 | 1 | 5 1 | 0.274 | | 15 |
| GARNER | | | | N | | HOUSTON | | | |
| 5 | 588 | 65 | 161 | 33 | 8 | 13 83 24 | 0.237 | | 05 |
| HEEP | | | | IN | | HOUSTON | | | |
| 198 | 116 | 47 | 14 | 1 | 4 | 22 0 | 0.238 | | 11 |
| HOWE | | | | IN | | HOUSTON | | | |
| 0 | 365 | 29 | 87 | 15 | 1 | 5 38 12 | 0.333 | | 7 |
| IVIE | | | | IN | | HOUSTON | | | |
| | 6 | 0 | 2 | 0 | 0 | 0 0 0 | | | |

Display window

*Fig. 15*

| actions | nouns | attributes | modifier |
|---|---|---|---|
| Find  Delete | courses | (specific course departments) | whose course department is |
| Insert | sections | (specific titles) | whose course title is |
|  | instructors | (specific section departments) | whose section department is |
| features | interests | (specific section #s) | whose section # is |
| credits | prerequisites | (specific start-hours) | whose start-hour is |
| department | (specific courses) | (specific end-hours) | whose end-hour is |
| title | (specific sections) | (specific rooms) | whose room is |
| section | (specific instructors) | (specific instructors) | whose instructor is |
| start-hour | (specific interests) | (specific instructor names) | whose name is |
| end-hour | (specific prerequisites) | (specific spouses) | whose spouse is |
| room | (a new course) | (specific instructor ranks) | whose rank is |
| instructor |  | (specific campus addresses) | whose batter runs is |
| name | comparisons | (specific extensions) | whose campus address is |
| spouse | between | (specific faculty) | whose extension is |
| rank | greater than | (specific interests) | of |
| campus address | less than | (specific prerequisite departm) | which are |
| extension | greater than or equal to | (specific prerequisite departm) | whose prerequisite department is |
| interests | less than or equal to | (specific number) | whose prerequisite department 2 is |
| department 2 | equal to | operators | whose course course # is |
| course # |  | and | whose section course # is |
| course #2 |  | or | whose prerequisite course # is |
|  |  |  | whose prerequisite course # 2 is |
|  |  |  | whose number of credits is |
|  |  |  | which are interests of |
|  |  |  | which are taught by |
|  |  |  | which are offerings of |

NLMENU interface Baseball demo—(Version LM2)

commands

| Re-start | Rubout | Show query | Execute  X | Exit system |
|---|---|---|---|---|
| Refresh | Save Q | Retrieve Q | Dlt. Q's | Play Q |

Find courses whose course department is CS and whose course title is DATA BASE MANAGEMENT SYSTEMS or INDEPENDENT STUDY IN CS ▮

Query

Display window

*Fig. 16*

MENU-BASED NATURAL LANGUAGE UNDERSTANDING SYSTEM

This application is a continuation of application Ser. No. 898,875, filed Aug. 21, 1986 abandoned which is a continuation of Ser. No. 462,151 filed Jan. 28, 1983 abandoned.

BACKGROUND AND SUMMARY OF THE INVENTION

A microfiche appendix is part of this patent containing 8 microfiche and 400 frames.

The present application relates to a computer input interface system.

The present invention permits users who are unaware of system constraints and who are completely naive regarding computer operation to provide intelligible inputs to a computer system. It also enables experienced users to interact in a clearer and simpler way.

Providing access to computer systems with natural language is a very important step towards the construction of computer systems which are easy to use. However, although "ease of use" is currently a central goal of builders of computer systems, and although research into the construction of natural language interfaces has gone on for over fifteen years (resulting in the construction of many prototype systems), natural language interfaces are not in common use today. The reason for this is that the natural language interfaces that have been constructed to date are quite difficult to use.

This invention solves the problem of providing USABLE natural language interfaces to computer systems. Users need not learn or remember system limitations. Additionally, both implementation time and processing time for natural language interfaces are decreased.

Natural language interfaces that have been constructed employ a grammar which characterizes the class of acceptable input strings. A parser then accesses this grammar to produce a parse tree (or parse trees for ambiguous input) for the input string. This parse tree is then translated into an expression (or set of expressions) which represent the meaning of the input string and which are interpretable by the computer system for which the interface has been built. A wide variety of grammar formalisms and parsing algorithms have been used. Most of these grammar formalisms can, however, be classified under the general heading of augmented context-free grammars. What this means is that the basic grammar rules are rules of a context-free grammar but each context-free rule has, associated with it, augmentations which give the grammar added power. These augmentations generally access attributes (and sometimes values) of the nodes of the context-free rules.

Linguistic theories based on this class of grammars are those of Gazdar (1982), Bresnan and Kaplan (see Kaplan and Bresnan, 1981 and Bresnan, 1982), and Ross and Saenz (see Ross, 1981 and Saenz, 1982). Parsers for constructing natural language interfaces which utilize grammars of this general class are the DIAMOND Parser developed at SRI (see J. Robinson, 1980), the GPSG Parser developed at HP (see Gawron, King, Lamping, Loebner, Paulson, Pullum, Sag, and Wasow, 1982) and many others. Note that this description is neutral between syntactically-based and semantically-based grammars. In general, these (and other) frameworks are adequate for characterizing both classes of grammars.

Natural language parsers are generally based on one of several parsing algorithms that have been employed for parsing context-free grammars (for example, see Earley, 1980, Younger, 1967, Griffiths and Petrick, 1965, and Ross, 1981). First, a context-free parse is performed. Then, the augmentation rules are used. In some systems, a partial context-free parse is done, then whatever augmentations that are relevant to that portion of the parse are done. This procedure is then iterated until a complete parse is found.

A notable exception to this general trend is the TQA System that has been under development for the past ten years at IBM (see Plath, 1975 and Petrick, 1973). It is based on the theory of transformational grammar (see Chomsky, 1965) and it employs, as grammar rules, several hundred inverse transformations. A transformational parser applies relevant transformations to yield a set of parse trees.

The primary application for natural language interfaces has been to natural language database query systems. For all natural language systems, the user has been required to type his question into the keyboard of a computer terminal. When the entire question had been input, the natural language interface began processing the input string. Processing resulted either in an answer to the user's query or a response that indicates that the query was not understood.

As of yet, natural language systems have not been put into common use. This is because the current state of the art is such that all systems that are constructed have many limitations in coverage. That is, they can only understand a small subset of all possible natural language queries. The construction of a system which can understand all (or even a substantial part) of English, or any other natural language, is impossible today. This is likely to remain impossible for many years to come. Thus, in order for current natural language systems to prove useful, the user communities that utilize these systems will have to be able to adapt to system limitations. They will have to learn the limitations of the system and thereby restrict their input to only the subset that can be understood by the system. Unfortunately, users have been unable to learn these limitations and have therefore been unable to successfully utilize language interfaces.

Tennant (1980) performed the first and only extensive evaluation of a natural language interface. This evaluation was performed for the PLANES system, a natural language database query system that accessed a military aircraft maintenance database in natural language. The results of this evaluation show quite clearly why natural language interfaces are not in common use today. About ⅓ of the queries input to the system by users were not understood, even though the task assigned these users was to solve problems that had been specifically designed to correspond to relatively straightforward queries.

Additionally, all of the queries that were input to the system were simple queries, containing about 6 or 7 words. Often this meant that many queries were needed in order to solve each problem assigned the user. More complex queries, which could have greatly reduced the amount of input required, were never attempted, even though the system had the ability to handle some of these. The reason that more complex queries were not attempted appears to be that the high failure rate for the simple queries gave the users little confidence that more complex ones would work. Thus, the users never attempted to formulate complex queries.

A second reason that natural language interfaces are not in common use today is the large amount of time it has traditionally taken to construct a natural language interface. Current technology is such that each interface must be constructed on a case by case basis for each application. Efforts taking from 10 to 30 man years per application are not uncommon. Thus, only applications that can justify such a large expenditure of manpower are candidates for possible applications. However, given the quality of the system that results, the effort has not proven to be worthwhile.

In the present invention, the user is not required to type a well formulated input to the natural language understanding system, but rather is instead presented with a set of menus. The user successively chooses words or phrases (or numbers, etc.) from the menus to construct his input. At any point in the construction of a natural language input sequence by the user, only a subset of the set of menus in active. These menus have white backgrounds with black printing. Inactive menus have dark backgrounds and white printing. The user is only allowed to choose from active (or white) menus. Items are selected from menus by using a mouse. The mouse is moved on the table and a pointer moves in response to this on the screen. When the pointer is over the desired item, that item can be selected by pushing a button on the mouse.

Additionally, at various points in the construction of natural language input, only a subset of the items in a menu will be active. Those items in an active menu that are not active at a particular point will not appear in the menu at that point. Thus, at any particular point in the construction of natural language input, only those words or phrases that could legally come next will be available for the user to select. Thus, sentences which cannot be processed by the natural language system can never be input to the system, giving a 0% failure rate.

The mode of user interaction with the system is a primary novel aspect of this invention. All previous systems required users to type queries and thereby required the user to learn and adapt to the limitations of the natural language system. Because of the users' inability to learn and adapt, high failure rates result, even for simple queries, in traditional systems. Our system solves this serious problem. System limitations are made obvious, and all sentences that can be input are understood.

Thus, it is an object of the present invention to provide a system for interfacing to a computer, which does not require the user to know any computer language whatsoever.

It is a further object of the present invention to provide a computer interface system which does not require large amounts of time for a user to become accustomed to using the interface system.

It is a further object of the present invention to provide a computer interface system which permits natural language inputs, but prevents the user from offering any ill-formed inputs.

It is a further object of the present invention to provide a natural-language understanding computer interface system which does not require a large and complex grammar to be specified.

It is a further object of the present invention to provide a computer interface system, in which users can direct natural language queries to a relational database system without knowing how to type.

According to the present invention there is provided:

1. An interface system for providing formally constrained outputs to a computing system in accordance with the natural language inputs in a predefined natural language subset, which has a predefined correspondence to the set of said formally constrained outputs, received from an unskilled user, said interface system comprising:

output means, for indicating to said user a set of permissible items;

designating means, for designating, under control of said user, a particular item from among those indicated by said output means;

parsing means for cumulatively parsing natural language inputs in the form of sequences of items successively designated by said user through said designating means, and for repeatedly generating and indicating on said output means all permissible items which could immediately follow the currently received sequence of items in accordance with said predefined natural language subset; and means for translating the parse of a completed input into an executable machine command, in accordance with said predefined correspondence.

BRIEF DESCRIPTION OF THE DRAWINGS

The present invention will be described with reference to the accompanying drawings, wherein:

FIG. 1 shows an example of the menu initially presented to the user, where the user is attempting to extract information from a baseball-statistics database;

FIG. 2 shows a further step in the operation of the system shown in FIG. 1, wherein a different window menu is active;

FIG. 3 shows a further step in the user construction of a database query in the system of FIG. 1;

FIG. 4 shows a further step in the construction in the same query, showing user selection of an expert item, namely the item "(specific batter teams)";

FIG. 5 shows a further step in the construction of the same query, wherein the expert item selected by the user has called for a pop-up expert window;

FIG. 6 shows a further step in construction of the same input query, after the expert has finished its function;

FIG. 7 shows a further step in the construction of the same query, wherein a numerical comparison operator is being selected;

FIG. 8 shows a pop-up number expert, to facilitate user entry of numerical inputs;

FIG. 9 shows a further step in the entry of the same query;

FIG. 10 shows how the show-query command translates a user's query into an executable machine command;

FIG. 11 shows a sample actual response to the user query;

FIG. 12 shows the appearance of a "mouse-sensitive" item (in this case, the number 0.25") within the query already constructed;

FIG. 13 shows an example of a different query, in which the user has input an ambiguous query;

FIG. 15 shows the pop-up held expert;

FIG. 16 shows a sample of the initial menu appearance for access to a different database.

DESCRIPTION OF THE PREFERRED EMBODIMENTS

Figure 14:
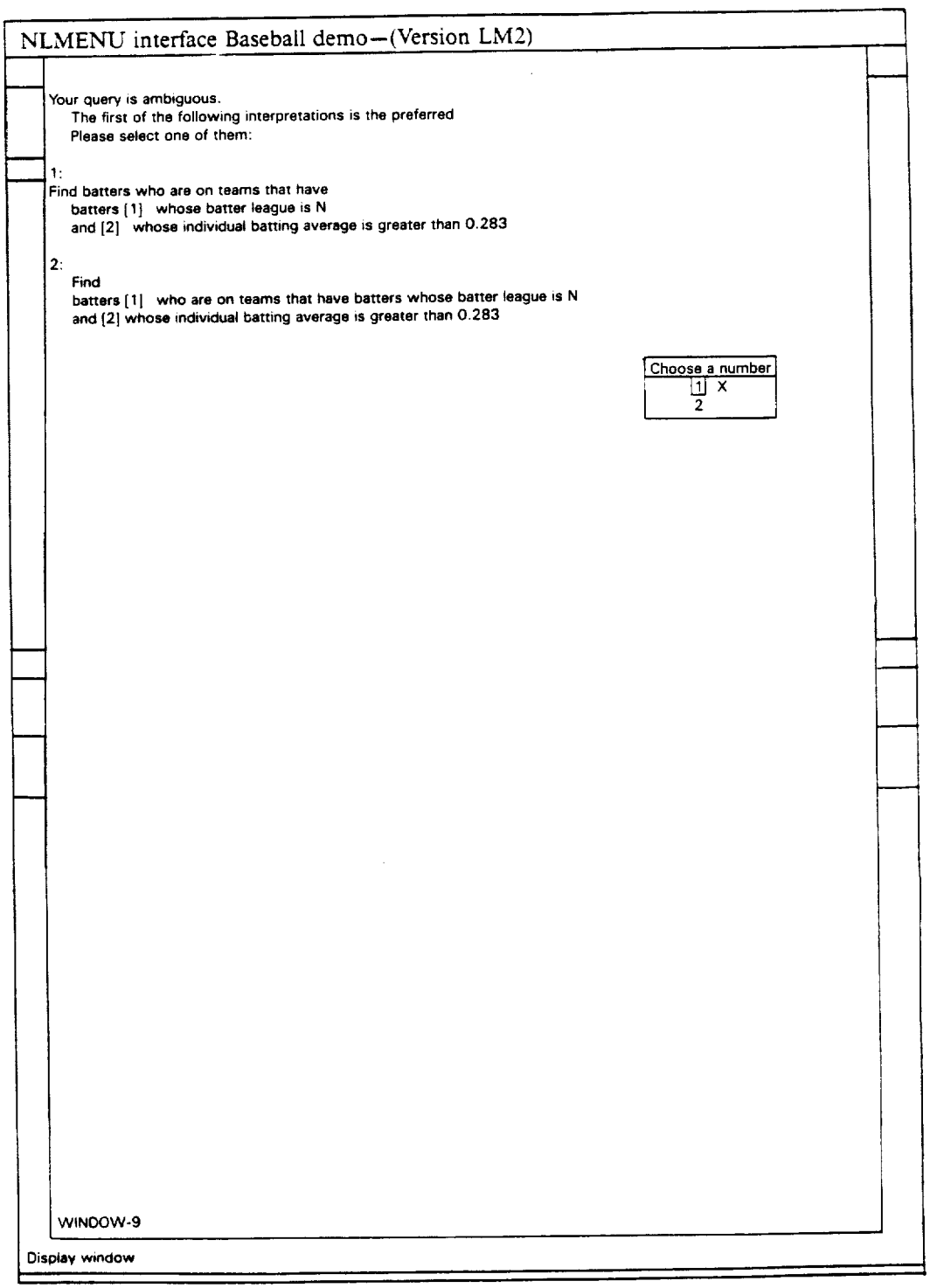
FIG. 14 shows the system's response to attempted execution of an ambiguous query, such as that shown in FIG. 13.

The present invention will be described with primary reference to the presently preferred embodiment, wherein data base queries and updates are addressed to a relational data base. The natural language inputs are parsed using a parser which is generally similar to that disclosed in the 1981 dissertation of Ken Ross entitled "Parsing English Phrase Structure". The system is coded in LISP, and has been demonstrated on a LISP machine from LMI Incorporated. However, as will be obvious to those skilled in the art, the present invention can alternatively be realized using a wide variety of other physical systems, and the key ideas of the invention can also be translated into other programming languages than LISP. For example, a further embodiment of the present invention, which is presently under development, realizes the present invention on a Texas Instruments Professional Computer, instructed by source code which is written in "C". It should also be noted that the particular parser used in the preferred embodiment is not necessary to the invention, but other parsers can be used. Numerous parsers have been disclosed in the prior art. However, the presently-preferred embodiment uses a parser which will be described in great detail.

As discussed above, the end result which the present invention seeks to achieve is to permit the user to input well-understood sentences in a convenient language, which is preferably a subset of a natural language (such as English). According to this invention, after the user has input each successive word of a sentence, the set of all possible next words which could form the continuation of a grammatical sentence is displayed to the user, so that he needs only to select one of the possible next words. (More broadly, some of the possible inmuts can be lumped together as a category, so that one of the displayed items would be, e.g., "(specific number)", as will be discussed below.)

In general, this is accomplished by parsing partial inputs received from the user as they are received, so that the parser generates the set of possible functional descriptions which could be the next element in a legal input, and displays a set of words (corresponding to these functional descriptions of possible next elements). Thus, the end result of the operation, after the user has input a complete sentence, is a parsed command which is in accordance with the predefined grammar, and therefore can be trivially translated into an executable instruction, as will be discussed below.

The first step in the implementation of this method which will be described in detail is the operation of the parser itself. A simplified version of the parser will first be described, and then the modifications which permit word-at-a-time parsing and prediction will be described. The preferred parser can be specified in terms of nonstandard turing machine instructions, as described by Griffiths and Petrick, which operate on the upper elements of an alpha stack and a beta stack in accordance with the current state of the upper elements of the two stacks. The topmost elements of these stacks are represented as an ordered pair such as (XY, ZW), where X is a string variable corresponding to the upper elements of the alpha stack, Y is the next element of the alpha stack after X, Z represents the upper elements of the beta stack, and W is the next element of the beta stack. The parser rules can then be stated as:

1. If one of the rules of the grammar which can be applied is of the form $A \rightarrow V_1 V_2 \ldots V_n$, then we map a condition $(V_1 Y, X)$ onto $(Y, V_2 \ldots V_n t A X)$, and we attach $V_1$ as a node beneath A. However, this rule is applicable only if X is in the set of "non terminals", that is if X itself represents a partial parsing tree rather than a first-level input, such a word or the immediate classification of a word (e.g. noun, adjective, determiner, etc.). The symbol "t" is merely a placeholding symbol, which is used in this formalism to permit proper application of the succeeding parser rules. Thus, this first partial rule stores the possibility that $V_1$ is the beginning of a group which can be parsed under a higher level node A (e.g., the possibility that, if $V_1$ is a determiner, it is the beginning of a noun phrase such þthe parts"). Where an element is associated beneath another element, this provides one step in building up the tree of associated nodes which will eventually form a complete parse. Thus, a sample of a completed parse, in a grammar roughly corresponding to English, might be as follows:

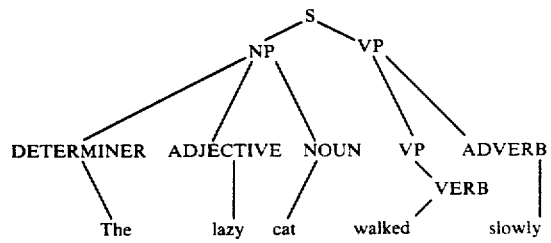

The first association is always a direct translation from a specific word (e.g. "cat") to its directly associated category ("noun"). However, it should be preliminarily noted here that the categories used need not be as broad as familiar English-language parts of speech, but, at least for database-query applications, are preferably modified to include some semantic information. Thus, in the presently preferred embodiment, categories such as "number-noun phrase", "worker-noun phrase", "operation-noun phrase", "job card-noun phrase", and others are used. (Such grammars are known in the art as "semantic grammars".)

Intuitively, parser Rule 1 means that, where a rule of grammar might be applicable to a topmost element on stack alpha ($V_1$), that element is removed from the top of stack alpha, and stack beta is pushed down, successively, with the hypothetical parent node of $V_1$ (together with $V_1$ associated below it), with a place holding symbol "t", and with the remaining symbols which would be required by the possibly-applicable rule of grammar ($V_2 \ldots V_n$). For convenience, we restate parser rule 1 again:

Rule 1: If one of the available rules of grammar applied can be stated as $A \rightarrow V_1 V_2 \ldots V_n$; and if a non terminal X is on top of stack beta; then $(V_1 Y, X)$ maps onto $$(Y, V_2 \ldots V_n \ t \ \underset{V_1}{A} \ X).$$

2. The second rule of the parser shows how the place holding symbol t is used to indicate that a perfected partial parse can be transferred from stack beta to stack alpha;

Rule 2: If the place holding symbol t is on top of the stack beta, and is immediately followed by a nonterminal symbol A, the place holding symbol t is deleted and the nonterminal symbol A is transferred from the top of stack beta over to stack alpha:

$$(X, \underset{n}{t} \quad \underset{n}{A} \quad Y) \text{ maps onto } (\underset{n}{A} \quad X, Y).$$

Intuitively, the allocation of functions between stacks alpha and beta is that stack alpha contains only parse trees or well-formed subparts of parse trees, whereas stack beta is used to hold partially formed subpart of parse trees.

3. The third rule is used to determine when a necessary portion of the elements required to complete a parse have been found. The formal statement is:

Rule 3: $(B\ Z, B \ldots tQ)$ maps onto $(Z, \ldots tQ)$
with $B$ having child $P_n$ on the left side, and on the right side $B$ with child $P_n$.

The operation of the parser is initiated by loading the string of words to be parsed into stack alpha, followed by a numeral sign, and by loading the higher level symbol corresponding to the root node of the tree to be constructed, followed by a numeral sign, on stack beta. That is, where (as is usual) the parser is serving to organize strings of words into properly parsed sentences, the symbol which indicates a complete sentence in the grammar (in rules such as S→NP VP) is loaded onto stack beta. Thus, the initial condition of the procedure can be represented as $(W_1 W_2 \ldots W_n\#, S\#)$.

A successful parse has been found when the final condition of the two stacks is $(S\#, S\#)$. In this case, the nodes below the S on the alpha stack provide the desired complete parse. If the root node (i.e. the object of the parsing) is not a sentence parse, but, for example, a noun phrase parse, then the condition indicating a successful parse would be correspondingly different, e.g. $(NP\#, NP\#)$.

When no rule is applicable, the instant parsing path represents a bad parse, and the parser must retrace and follow a different parsing path.

When more than one parser rule can be applied, and/or when more than one rule of the grammar can be applied through parser rule 1, alternative parsing paths must be followed. Eventually, all of the alternative parsing paths will result in either successful or unseccessful parses. The set of seccessful parses represents the output of the parser, after completion of the parsing process. This has substantial advantages in the present invention, as described below.

An example of the operation of this simplified version of a parsing procedure will now be given. Suppose, for example, that the grammar to be applied is as follows:

(3.4) Grammar
S→A B
S→A B C
A→A C
A→x
B→C B
B→z
C→y

In this example, the input string is "xyz", which is to be parsed as an "S".

TABLE 1

| Parser Rule | Stack Alpha | Stack Beta | Grammar Rule |
|---|---|---|---|
|  | x y z # | S # |  |
| Rule (1) | y z # | t A S # <br>     \|<br>    x | A ⟶ x |
| Rule (2) | A y z # <br> \| <br> x | S # |  |

Rule (1) applicable 3 Ways:
See continuations 1.1, 1.2 and 1.3

| Parser Rule | Stack Alpha | Stack Beta | Grammar Rule |
|---|---|---|---|
| Cont. 1.1 <br> Rule (1) | y z # | B t S S # <br> / <br> A <br> \| <br> x | S ⟶ AB |
| Rule (1) | z # | t C B t S S # <br> \|   / <br> y A <br>    \| <br>    x | C ⟶ y |
| Rule (2) | C z # <br> \| <br> y | B t S S # <br> / <br> A <br> \| <br> x |  |
| Rule (1) | z # | B t B B t S S # <br> /    / <br> C   A <br> \|    \| <br> y    x | B ⟶ CB |

TABLE 1-continued

| Parser Rule | Stack Alpha | Stack Beta | Grammar Rule |
|---|---|---|---|
| Rule (1) | # | t B B t B B t S S # <br> \| / \ / <br> z C A <br> \| \| <br> y x | B ⟶ z |
| Rule (2) | B # <br> \| <br> z | B t B B t S S # <br> / \ / <br> C A <br> \| \| <br> y x | |
| Rule (3) | # | t B B t S S # <br> / \ / <br> C B A <br> \| \| \| <br> y z x | |
| Rule (2) | B # <br> / \ <br> C B <br> \| \| <br> y z | B t S S # <br> / <br> A <br> \| <br> x | |
| Rule (3) | # | t S S # <br> / \ / <br> A B <br> \| / \ <br> x C B <br> \| \| <br> y z | |
| Rule (2) | S # <br> / \ <br> A B <br> \| / \ <br> x C B <br> \| \| <br> y z | S # | |
| | PARSE FOUND | | |
| Cont. 1.2 | | | |
| Rule (1) | y z # | B C t S S # <br> / <br> A <br> \| <br> x | S ⟶ A B C |
| Rule (1) | z # | t C B C t S S # <br> \| / <br> y A <br> \| <br> x | C ⟶ y |
| Rule (2) | C z # <br> \| <br> y | B C t S S # <br> / <br> A <br> \| <br> x | |
| Rule (1) | z # | B t B B C t S S # <br> / \ / <br> C A <br> \| \| <br> y x | B ⟶ CB |
| Rule (1) | # | t B B t B B C t S S # <br> \| / \ / <br> z C A <br> \| \| <br> y x | B ⟶ z |
| Rule (2) | B # <br> \| <br> z | B t B B C t S S # <br> / \ / <br> C A <br> \| \| <br> y x | |
| Rule (3) | # | t B B C t S S # <br> / \ / <br> C B A <br> \| \| \| <br> y z x | |

TABLE 1-continued

| Parser Rule | Stack Alpha | Stack Beta | Grammar Rule |
|---|---|---|---|
| Rule (2) | B# <br> / \ <br> C  B <br> |   | <br> y   z | B C t S S # <br> / <br> A <br> | <br> x | |
| Rule (3) | # | C t S S # <br> / \ <br> A   B <br> /   / \ <br> x  C  B <br>    |  | <br>    y  z | |

BAD PATH - NO INSTRUCTIONS APPLY

| | | | |
|---|---|---|---|
| Cont. 1.3 <br> Rule (1) | y z # | C t A S # <br> / <br> A <br> | <br> x | A ⟶ AC |
| Rule (1) | z # | t C C t A S # <br> |  / <br> y  A <br>    | <br>    x | C ⟶ y |
| Rule (2) | C z # <br> | <br> y | C t A S # <br> / <br> A <br> | <br> x | |

Rule (1) and Rule (3) both applicable -
See continuations 2.1 and 2.2

Cont. 2.1

| | | | |
|---|---|---|---|
| Rule (1),$ | z # | B t B C t A S # <br> /   / <br> C  A <br> |  | <br> y  x | B ⟶ CB |
| Rule (1) | # | t B B t B C t A S # <br> |  |  / <br> z  C  A <br>    |  | <br>    y  x | B ⟶ z |
| Rule (2) | B # <br> | <br> z | B t B C t A S # <br> /  / <br> C  A <br> |  | <br> y  x | |
| Rule (3) | # | t B C t A S # <br> / \   / <br> C  B A <br> |  | | <br> y  z x | |
| Rule (2) | B# <br> / \ <br> C  B <br> |  | <br> y  z | C t A S # <br> / <br> A <br> | <br> x | |

BAD PATH - NO INSTRUCTIONS APPLY

Cont 2.2 -

| | | | |
|---|---|---|---|
| Rule (3) | z # | t A S # <br> / \ <br> A  C <br> |  | <br> x  y | |
| Rule (2) | A z # <br> / \ <br> A  C <br> |  | <br> x  y | S # | |

Rule (1) applicable 3 ways -
See continuations 3.1, 3.2 and 3.3

TABLE 1-continued

| Parser Rule | Stack Alpha | Stack Beta | Grammar Rule |
|---|---|---|---|
| Cont 3.1<br>Rule (1) | z # | B t S S #<br>    A<br>  /  \\<br> A   C<br> \|    \|<br> x    y | S ⟶ AB |
| Rule (1) | # | t B B t S S #<br>   \|   A<br>   z / \\<br>    A  C<br>    \|   \|<br>    x   y | B ⟶ z |
| Rule (2) | B #<br>\|<br>z | B t S S #<br>  A<br> / \\<br>A  C<br>\|   \|<br>x   y | |
| Rule (3) | # | t S S #<br>  A  B<br> / \\ \|<br>A  C z<br>\|   \|<br>x   y | |
| Rule (2) | S #<br>/ \\<br>A  B<br>/\\ \|<br>A C z<br>\|  \|<br>x  y | S # | |

PARSE FOUND

| Parser Rule | Stack Alpha | Stack Beta | Grammar Rule |
|---|---|---|---|
| Cont. 3.2<br>Rule (1) | z # | B C t S S #<br>    A<br>   / \\<br>  A  C<br>  \|   \|<br>  x   y | S ⟶ ABC |
| Rule (1) | # | t B B C t S S #<br>  \|    A<br>  z  / \\<br>    A  C<br>    \|   \|<br>    x   y | B ⟶ z |
| Rule (2) | B #<br>\|<br>z | B C t S S #<br>   A<br>  / \\<br> A  C<br> \|   \|<br> x   y | |
| Rule (3) | # | C t S S #<br> A  B<br> A  Cz<br> x  y | |

BAD PATH - NO INSTRUCTIONS APPLY

| Parser Rule | Stack Alpha | Stack Beta | Grammar Rule |
|---|---|---|---|
| Cont. 3.3<br>Rule (1) | z # | C t A S #<br>   A<br>  / \\<br> A  C<br> \|   \|<br> x   y | A ⟶ AC |

TABLE 1-continued

| Parser Rule | Stack Alpha | Stack Beta | Grammar Rule |
|---|---|---|---|
| Rule (1)$ | # | t B C t A S # <br> \| \| <br> \| A <br> \| /\ <br> z A  C <br> \| \| <br> x  y | B ⟶ z |
| Rule (2) | B # <br> \| <br> z | C t A S # <br> \| <br> A <br> /\ <br> A  C <br> \| \| <br> x  y | |

BAD PATH - NO INSTRUCTIONS APPLY

DONE

The foregoing carefully-worked-out example shows in detail the operation of a parser based on a context-free grammar. It can easily be seen from this example that the formal manipulation rules as set forth above translate very simply into programmable operations. For example, the final status of stack beta, in the very last step of the preceding worked-out example, could be easily represented in Lisp by a list formatted, e.g., as follows:

(Ct(A(A(Ax)(Cy)))S).

Note that the # is not required in the Lisp implementation, since an empty list is easily tested for.

As noted, the parser set forth above must be modified for use in the present invention. The parser used in the present invention must be able to produce the set of items which can come next, in addition to creating a parse tree. In order to do this, the parser must be able to begin parsing as soon as the first word or phrase is input. It cannot, as the parsers which have generally been employed in prior art natural language understanding systems do, wait until the entire sentence is input before it begins to parse. The parser set forth in the 1982 Ross publication does have the ability to begin parsing immediately upon input of the first word or phrase. Thus, the presently preferred embodiment uses a modification of this parser, as will now be set forth.

For consistency with the published literature, the formalism of the parser will now trivally be altered. A 3-stack informal turing machine formalism will now be used, which differs slightly from the previous format in that the incomplete parse trees which were formerly held below the place holding symbol ♭t? in stack beta will now be held separately in a gamma stack.

This MSBT (Modified Selective Bottom to Top) parser is formally characterized in terms of turing machine instructions which apply to three stacks, alpha, beta and gamma. These instructions are of the following form, where A,B,C,D,E, and F can be arbitrary strings of symbols from the terminal and nonterminal alphabet.

(A,B,C)⟶(D,E,F) if "Conditions"

This is to be interpreted as follows:
If A is on top of stack alpha,
B is on top of stack beta,
C is on top of stack gamma, and "Conditions" are satisfied then replace A by D, B by E, and C by F.

Given this interpretation of the turing machine instruction, the MSBT parser is instantiated by the following turing machine instructions. To begin parsing a sentence, the input string to be parsed is put on stack alpha, the root symbol of the parse tree to be constructed is put on stack beta and 0 is put on stack gamma. ("0" indicates that there are no contents to the stack.)

(1) $(V1,X,Y) \rightarrow (0, V2 \ldots Vn\ t\ X, A\ Y)$ if $A \rightarrow V1\ V2 \ldots Vn$ is a rule of the phrase structure grammar, X is in the set of nonterminals, Y is anything, and A can be reached from X. (Whether A "can be reached from X" is shown in the reachability matrix, as will be discussed below. Briefly, the reachability matrix excludes impossible word sequences, such as "the the", among other things.

(2) $(X,t,A) \rightarrow (A\ X,0,0)$ if A is in the set of nonterminals (3) $(B,B,Y) \rightarrow (0,0,Y)$ if B is in the set of nonterminals of terminals.

(4) $(X,(C1\ C2 \ldots Cn\ ),Y) \rightarrow (X, C1\ C2 \ldots Cn, Y)$ (5) $(X,(C1\ C2 \ldots Cn\ ),Y) \rightarrow (X,0,Y)$ For all i, $Ci=(Cj\ Cj+1 \ldots Cp\ )$ or $\{C1\ C1+L \ldots Cm\}$ or X If X is in the set of terminals.

(6) $(X, \{C1\ X,Y) \rightarrow (X,\{,Y)$ (7) $(X, \{C1\ X,Y) \rightarrow (X,C1:,Y)$ if X not =}

(8) $(X, :\},Y) \rightarrow (X,0,Y)$ (9) $(X, \{C1\},Y) \rightarrow (X,C1,Y)$

(10) $(X, : C1,Y) \rightarrow (X, :,Y)$ where : is a special symbol which is neither a terminal or a nonterminal symbol.

C1 is a Ci type variable as defined earlier.

(Rules 4 through 10 are added to permit use of grammar rules which contain parentheses and curly brackets. These elements are nationally convenient. Curly brackets indicate that exactly one of the elements within the brackets is to be inserted. Parentheses indicate that one or more (or none) of the elements in parentheses can be inserted. Ci-type variables are added merely to keep track of nested brackets and parentheses although this function is easily accomplished in the Lisp implementation)

If no instructions apply, the root symbol is on top of stack beta, the same root symbol is on top of stack alpha, and stack gamma is empty, then a valid parse has been found. if no instructions apply and the above conditions are not true, then that path has ended without producing a valid parse of the input string. To obtain all valid parses of the input string, all paths must be pursued until they either produce a valid parse or end without producing a parse.

The parser is called selective because it employs a reachability matrix to eliminate bad parse paths before trying them as described in Ross (1981). The reachability matrix indicates whether X can dominate A where A is on a left branch. The reachability conditions are satisfied if X can dominate A in this configuration.

The reachability matrix is a Boolean matrix, which contains a logical value for each pair of nodes (N,M) in the grammar to indicate whether any legal parse tree could have node N as a leftmost daughter of node M. The construction of a full reachability matrix is preferably accomplished as set forth in Warshall and in Baker: See "A Note on Multiplying Boolean Matrices," Communications of the ACM (February 1962) p. 102, and "A Theorem on Boolean Matrices," Journal of the Association for Computing Machinery, Volume 9, Page 11 (1962), which are hereby incorporated by reference, Briefly, the grammar rule are used to construct a matrix for immediate reachability, that indicates which nodes can be immediate daughter nodes of which other nodes. This matrix is then multiplied by itself repeatedly, until it stabilizes, that is until further multiplication of the final matrix by the immediate reachability matrix produces no further change in the final matrix. This final matrix is itself then the reachability matrix. However, in the presently preferred embodiment, the full reachability matrix is not compiled, but instead a list is compiled, for each node in the grammar, listing the other leftmost daughter nodes which can be dominated by that node.

The rules stated thus far define a recognition procedure. It will determine whether or not a given string can be parsed into a tree dominated by the specified root node. The following addition is required to enable the parser to produce the parse tree(s) for the input string.

When (1) is applied, attach V1 beneath A.

When (3) is applied, attach the B on alpha B as the right daughter of the top symbol on gamma.

The parse tree will now appear on stack alpha, instead of just the root symbol.

The statement of the parser given above is neutral with respect to the control structure that the procedure employs. The preferred embodiments of the present invention use a breadth-first control structure, which carries a parse as far as possible for each word of the input string. Thus, after inputting the nth word, a complete parse up to that word has been performed.

For the parser to proceed in a breadth-first manner, it is only given the first word of the input string. Then, the item !MORE is inserted after that word. If no other instructions apply and !MORE is on top of stack alpha, the current contents of the beta and gamma stacks are saved and the parser backtracks to the last place that parse paths were split. Once all backtracking is completed, the next word is put on the top of stack alpha and one of the saved of each of the saved beta-gamma pairs is put on the beta gamma stacks. Parsing then begins again with one parser state for each beta-gamma pair. This procedure is repeated until there are no more words in the input string.

This function will be described in slightly more detail. To do this, a depth-first control structure must be described first.

A depth-first strategy pushes one state as far as it will go. To do this, apply one of the rules that are applicable, get a new state, and then apply one of the applicable rules to that new state. Continue this until either no rules apply or no parse is found. If no rules apply, it was a bad parse path. If a parse is found, it is one of possibly many parses for the sentence. In either case, continue on and pursue all other alternative paths by backtracking to the last choise point, picking another applicable rule, and continuing in the manner described earlier. By doing this until the parser has backed up through all possible choice points, all parses of the sentence will be found.

To parse breadth first and introduce the ability to begin parsing given only one word of the input and these are put on stack alpha. If not other instructions apply and !MORE is on top of stack alpha, the parser must begin to backtrack as described earlier. Additionally, the contents of stack beta and gamma must be saved. Once all backtracking is completed, the next word, followed by !MORE, is put on alpha and parsing begins again with a set of states, each containing the new input word on alpha an done of the saved tuples containing beta and gamma. This procedure is then iterated until all words have been processed. The ability to parse a word at a time is essential for the NLMenu System. However, it is also beneficial for more traditional natural language interfaces. It can increase the perceived speed of any parser since work can proceed as the user is typing and composing his input. Note that a rubout facility can be added by saving the beta-gamma tuples that result after parsing for each of the words. Such a facility is used by the NLMenu System.

It is straightforward to add a well-formed state table to a Parser modified in the way just described. Before beginning a parse with new input and set of beta-gamma pairs, the beta-gammas can be compared and those with common subgoals can be merged. This has also been implemented in the parser used for the NLMenu System.

The ability to predict the set of possible nth words of a sentence, given the first n-1 words of the sentence is the final modification necessary to enable this parser to be used for menu-based natural language understanding. Fortunately, this feature can be added in a staightforward way. Given any beta-gamma pair representing one of the parse paths active n-1 words of the sentence have been input, it is possible to determine the set of words that will allow that state to continue. To do this, look at the topmost symbol on stack beta of the tuple. This represents the most immediate goal of that parse state. To determine all the words that can come next, given that goal, the set of all nodes that are reachable from that node as a left daughter must be determined. Fortunately, this information is easily obtainable from the reachability matrix discussed earlier. Once the set of reachability nodes is determined, all that need be done is find the subset of these that can dominate lexical material. Now, if this is done for all of the beta-gamma pairs that resulted after parsing the first n-1 and the union of the sets that result is taken, the resulting set is a list of all of the lexical categories that could come next. The list of next words is easily determined from this, e.g. through the lexicon.

Note that not only does the ability to parse a word (or phrase) at at time enable the parser to be modified so that it can predict what can come next (as will be described below), but the ability to parse a word at a time also reduces parsing time. With traditional parsers where the entire sentence must be input before any parsing is done, no parsing can be done while the user formulates and inputs his query. However, if processing begins as soon as the first word or phrase is input, then the time it takes for a user to input his sentence can be put to productive use. Thus, rather than there being a delay of several seconds or more after the sentence is input, the parse is completed almost instantaneously after input is terminated because most of the work was done before the input was completed.

The most important feature of this procedure is that it can predict the set of possible terminal symbols that could be the nth input item, if it has completed parsing up to the (n-1)th input item. It is this facility that enables the proper menus and proper items in those menus to be displayed so that the next input item can be chosen from a menu. To enable the parser to compute this information, for each potential mother node, the list of all possible daughters that could be left corners must be computed. This can be done either directly by accessing the phrase structure rules or indirectly by first computing the reachability matrix and then looking at all pairs X and Y such that X can dominate Y as a left daughter. The preferred embodiment uses the first method. For each mother node of the rules, a list is compiled of all nodes that mother node can dominate as a left corner. This is done by running through all rules and compiling a list.

This process (highlighted menu, user selection, parse, new highlighted menu) is then continued, until the user indicates that he is finished with the sentence which he wishes to input. At this time, there is necessarily at least one valid parse tree in storage, as discussed above. However, it is possible that there may be more than one valid parse tree. Thus, for example, a sentence such as "find suppliers" who ship parts to suppliers who own airports and who are located in Boston) is formally ambiguous, since it is not clear whether the limitation "who are located in Boston" refers to the first set of "suppliers" referred or to the second set of "suppliers". To resolve such ambiguities, a final step in the presently preferred embodiment displays to the user, where more than one valid parse exists at the completion of a sentence input, alternative parsed versions of the input sentence, using indentations to show the relative referents of the dependent clauses. The user then selects between the alternative parses displayed, so that the end product is a single unambiguous parse of an input sentence.

The process by which such an unambiguous parse is translated into an executable machine command (or an output according to some constrained system, for other applications) will now be described.

Associated with every word in the lexicon, there is a translation. This translation is a portion of the meaning of a sentence in which the word appears. In order to properly combine the translations of the words in a sentence together, there is a rule associated with each context-free rule indicating the order in which the translations of the symbols on the right side of the arrow of a context-free rule are to be combined. These rules are parenthesized lists of numbers where the number 1 refers to the first item after the arrow, the number 2 to the second, etc.

For example, for the rule X→A B C D, a possible rule indicating how to combine translations might be (3 (1 2 4)). This rule means that the translation of A is taken as a function and applied to the translation of B as its argument. This resulting new translation is then taken as a function and applied to the translation of 4 as its argument. This resulting translation is then the argument to the translation of 3, which is a function.

In general, the translation of leftmost number applies to the translation of the number to its right as the argument. The result of this then is a function which applies to the translation of the item to its right as the argument. However, parentheses can override this as in the example above.

Translations that are functions are of the form "lambda x . . . x . . . ". When this is applied to an item like "c" as the argument, "c" is plugged in for every occurrence of x after the "lambda x" and the result is just the expression with the "lambda x" stripped off of the front and the substitution made. This amounts to a simplified version of "lambda" conversion as used by all work in Montague Grammar (See Montague 1973).

For example, consider the sentence "John hit Mary". A reasonable meaning might be (hit John Mary) If John is assigned to the lexical category NP and assigned the and assigned the meaning "John", and "Mary" is assigned to the lexical category NP and assigned the meaning "Mary", and if "hit" is assigned to the lexical category V and assigned the meaning "lambda x lambda y (hit y x)", the following rules will yield the desired meaning.

$$S \longrightarrow NP \ VP$$
$$(2 \quad 1)$$

$$VP \longrightarrow V \ NP$$
$$(1 \quad 2)$$

To see why this is so, note that the meaning of the subtree VP would be the result of applying the meaning of the V to the meaning of the NP because of the rule (1 2). The result of applying "lambda x lambda y (hit y x)" to Mary is "lambda y (hit y Mary)". The meaning of the entire tree is the meaning of the VP, via the function "lambda y (hit y Mary")), applied to the meaning of the NP, John. This function applied to this argument produces "(hit John Mary)".

The forgoing discussion shows how inputs are parsed in accordance with a predefined grammar and lexicon. It should be noted that the present invention is applicable to constraining natural language inputs in accordance with any system which can be formally represented by a comparable grammar and lexicon. That is, the present invention is not applicable solely to data base query systems, but can be used to generate well-formed executable machine commands in any machine language using natural language input. Moreover, the present invention is not applicable only to semantic grammar-defined systems, but can also be used with sybtactics-grammar defined systems. Moreover, the present invention is not applicable only to provide executable machine commands as outputs, but can be used to provide formally constrained outputs of any type whatsoever, from a natural language input, as long as a correspondence between the desired set of formally constrained outputs and a natural language subset which has a well-formed grammar can be defined.

The class of grammars currently used by the parser is context-free grammars (or CFG's). Any arbitrary context-free grammar is permitted, with two minor exceptions to be discussed after context-free grammars are defined.

Context-free grammars consist of an alphabet of symbols and a finite set of rules containing these symbols. Symbols are classified as being either terminal symbols or nonterminal symbols. Terminal symbols are those symbols which appear in the lexicon (or dictionary) and thereby classify words according to categories. For example, terminal symbols commonly used in linguistic work are shown to the left of the colon in the example lexicon below.

Determiner: the,a
Adjective: lazy,red
Noun: cat,book
Verb: ate,saw
Adverb: slowly,greedily Nonterminal symbols are those symbols which are not terminal symbols.

Rules are of the form A→B1 ... Bn (where n>0). The Bn's are either terminal or nonterminal symbols. A is a nonterminal symbol. As a simple example, consider the following set of rules:

S→NP VP
NP→Determiner Adjective Noun
VP→VP Adverb
VP→Verb

Given the lexicon shown earlier, the above grammar will determine whether sentences containing words in the lexicon are grammatical or ungrammatical, once a nonterminal symbol is assigned as the designated symbol for the grammar. The designated symbol indicates what a sentence is.

The process of taking a sentence and determining whether it is grammatical, given a grammar, is called parsing. The result of parsing a sentence is one or more parse trees if the input is a valid sentence. If the input is not a sentence, parsing produces no parse trees. For example, if S is assigned to be the designated root symbol, the sentence "The lazy cat ate greedily" is ruled grammatical by the above grammar because the following tree is the result of parsing that sentence with the above grammar.

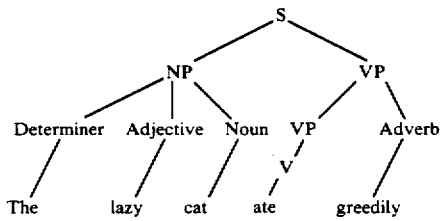

Any arbitrary context-free grammar is permitted as input to the parser except for those grammars containing two classes of rules. These are rules of the form X→null and sets of rules that generate cycles, for example, A→B, B→C, C→D and D→A. The problem with the first class of rules is that they make it very difficult for the predictive version of the algorithm to determine all and only those words that can come next in a sentence. The problem with the second class of rules is that they result in an infinite number of possible parse trees for a given sentence.

The elimination of the second class of rules causes no difficulty and and does not impair a grammar writer in any way. The elimination of the first class of rules causes a small inconvenience in that it prevents grammar writers from using the existence of null nodes in parse trees to account for certain unbounded dependencies like those found in questions like "Who do you think I saw?" which are said in some linguistic theories to contain a null noun phrase after the word "saw". However, alternative grammatical treatments, not requiring a null noun phrase, are also commonly used. Thus, the prohibition of such rules merely requires that these alternative grammatical treatments be used.

A sample grammar and lexicon is provided in the Appendix.

Simpler and smaller grammars would result if the class of grammars allowed was extended to allow augmentations to be associated with the context-free rules. The process of automatically generating a grammar for relational database applications would be greatly simplified by this extension in the class of grammars as well. This would result in increased efficiency throughout the system.

Below, such an extension is described. It is essentially a simplified version of the grammars formulated and characterized as Local Grammars in Ross (1981) and Saenz (1982).

Two modifications are necessary. Firstly, lexical items (terminal nodes) will have syntactic features associated with them. This idea is not new (see, for example, Chomsky (1965)). In general, the values of syntactic features have been thought to be binary. So, for example, a singular noun would have a feature named SING with a value of + and a plural noun would have a value of − for the feature SING. Instead, features will be allowed to take on more than two values. This option was first discussed for syntax in Friedman (1973) and her paper provides arguments in favor of this approach within a transformational framework. Feature values are constrained to be strings of a finite number of concatenated symbols. Friedman constrained possible feature values even further because of constraints placed on her system by a transformational component.

The second modification is a mechanism which will allow feature names and values to be assigned to nonterminal nodes. The idea that nonterminal nodes have features associated with them has been implicit in many syntactic analyses which have been proposed. It has been explicit in some analyses, too. Dougherty (1970, 1971) enriches the mechanism which Chomsky (1965) utilizes to assign features and thereby is able to assign features to some nonterminal nodes. The grammar used by the TQA (Transformational Question Answering) described in Plath (1973) assignes features to non-terminal nodes by transformation.

A very general mechanism which will assign features to nodes of trees, based on other features of the nodes of that tree, was proposed in Knuth (1968). Petrick (1973) adopts this mechanism, using somewhat different notation. The work of these researchers has been built upon in the design of the feature percolation mechanism described here. The mechanism is a constrained version of Knuth's.

Knuth's mechanism enables feature names (attributes in Knuth's terms) and their values to be passed up and down a tree. Associated with each phrase structure rule, there is a set of rules which indicates how to pass the features around. These will be referred to as feature percolation rules. Knuth allows the value of a feature for any of the nodes expressed in a phrase structure rule to be set either to the value of a feature of any of the nodes of that phrase structure rule or to the value of a function applied to the values of features of any of the nodes expressed in that phrase structure rule. Once a feature value is assigned for a particular node, it does not change.

For a structure like the one given below, the features of Nom1 can be determined by either other features of the node itself, the features of the nodes below it (Nom2 and S), the features of the node above it (NP) or the features of its sister node (det).

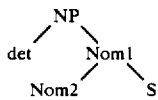

In turn, the features of these nodes could be determined by their mother node, daughter nodes, or sister nodes. This in effect means that information from anywhere in the tree can be transmitted to the nodes which determine the features of Nom1.

Utilizing Petrick's notation to illustrate this, the following feature percolation rules could be associated with the phrase stucture rule given below.

NP→det Nom
FEATURE1(0)=F1 (FEATURE2(0),FEATURE3(2))
FEATURE3(2)=F2(FEATURE4(1))
FEATURE4(1)=FEATURE4(2)

The numbers 0,1, and 2 indicate the nodes represented in the phrase structure rule. 0 is the node to the left of the arrow, the NP node. 1 is the node immediately to the right of the arrow, the det node. 2 is the second node to the right of the arrow, the Nom node. In general, N will be the Nth node to the right of the arrow (for N>0).

The first feature rule is interpreted as setting the value of FEATURE1 for the NP node to the result of applying the function F1 to the values of FEATURE2 of the NP node and FEATURE3 of the Nom node.

Local Grammars constrain the value of a feature of a node to only be determined by values of features present on nodes that that node dominates (nodes that dominate others are above those others in a tree).

This means that the feature values of the nodes of any subtree can only depend on the feature values within that subtree. This is accomplished by restricting feature percolation rules so that features will only percolate up the tree, not down. Thus, only percolation rules in which a feature of the 0 node is being determined by a function applied to the values of the features of nodes 1 through N or by the value of a feature of one of nodes 1 through N (where this feature percolation rule is associated with a phrase structure rule with N elements following the arrow) are permitted.

Another class of augmentation rules are used as well. These check the features of nodes and filter out ill-formed structures based on the values of these features. These rules are called feature blocking rules and will be written as conditions on the values of the features of the nodes to the right of the arrow. Petrick's notation will be utilized for these rules as well, but here it should be interpreted somewhat differently. In general, blocking rules will state that the value of a feature of nodes 1 through N or the value of a function applied to the values of the features of nodes 1 through N must be equal to either the value of a feature of nodes 1 through N or the value of a function applied to the value of features of nodes 1 through N. These rules are not to be interpreted as assigning feature values. They are, instead, well-formedness conditions which indicate whether a subtree is valid, according to the grammar.

As an example of the feature mechanism in action, consider a hypothetical language with the following properties.

I: Verbs and Subject NP's agree in Number and Person
II: Nouns and their Determiner agree in Number and Gender
III: Adjectives and Nouns agree in Gender
IV: The language is SVO and in Noun Phrases, the order of constituents is Determiner-Adjective-Noun The following phrase structure rules and feature rules characterize the above situation if the values of the feature PERSON range over the numbers 1,2, and 3 (indicating first, second and third person), the values of NUMBER range over SING and PLUR, and the values of GENDER range over MASC and FEM.

```
S →      NP VP
Blocking
PERSON(1) = PERSON(2)
NUMBER(1) = NUMBER(2)
Percolation
none
VP →     V NP
Blocking
none
Percolation
PERSON(0) = PERSON(1)
NUMBER(0) - NUMBER(1)
NP →     det Adj N
Blocking
NUMBER(1) = NUMBER(3)
GENDER(1) = GENDER(3)
GENDER(2) = GENDER(3)
Percolation
NUMBER(0) - NUMBER(3)
PERSON(0) = PERSON(3)
```

An example of a tree which could be produced by these rules follows.

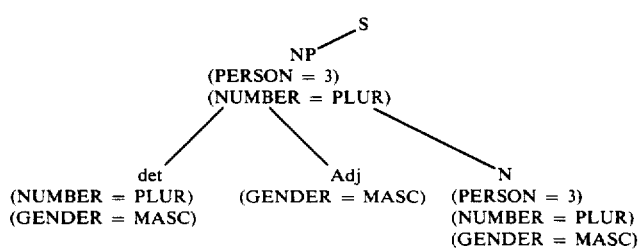

-continued

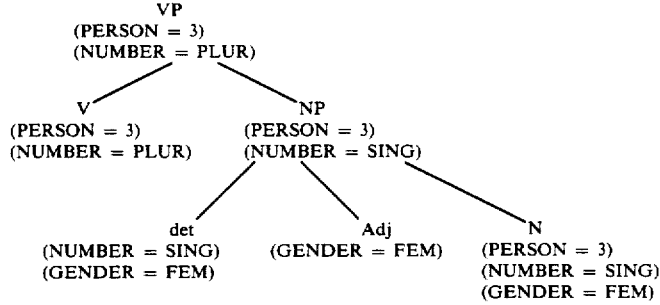

To do predictive parsing with a grammar like the one described above, in addition to calculating the reachability matrix for the context-free portions of the grammar rules, the percolation and blocking rules must be taken into account. There are several possible ways to do this.

One possibility is to construct a much larger reachability matrix which contains feature information. This can be done by having one entry in the reachability matrix for every possible set of attributes and values that can be associated with each of the symbols. Thus, in the example above, rather than just having an entry indicating whether NP can dominate det, one is required for whether NP with PERSON=2, NUMBER=SING and GENDER=FEM can dominate det with PERSON=3, NUMBER=SING and GENDER=FEM, one is required for whether NP with PERSON=2, NUMBER=SING and GENDER=FEM can dominate det with PERSON=2, NUMBER=SING and GENDER=FEM, etc. This information can be calculated from the percolation and blocking rules associated with the context-free rules that are traversed to determine if det can be reached from NP in the context-free case.

Except for very small grammars, this first solution would require a prohibitive amount of storage for the reachability matrix. A second solution is to do the same the calculation at the point where the reachability information is required rather than prestoring the answer in the reachability matrix. This would take quite a bit of calculation at run time.

A third choice, and the one seen as most promising, is to calculate the reachability matrix for the context-free version of the rules and then to associate an equation or set of equations with each item in the matrix. In the example above, these equations can be calculated from the percolation and blocking rules associated with the context-free rules that are traversed to determine if det can be reached from NP in the context-free rules. When the values of the features of the two nodes for which reachability matrix information is required are known, they are plugged into this equation. The result of this equation will be either true or false indicating reachability.

It is the ability to determine the set of terminals that can come next that differentiates the invention method from others and it is this ability that enables the proper items and menus to be displayed, thus insuring a 0% failure rate for natural language input to the system.

A sacrifice has been made to achieve this 0% failure rate, however. The preferred parser is only able to employ context-free grammars and cannot use the augmented context-free grammars that were discussed earlier. This is because the augmentations need to be taken into account when predicting the items that can come next. The present invention can be applied to augmented grammars as discussed above, but the capability is not included in the presently-preferred embodiment. Thus, the less powerful context-free grammars must be used. For a natural language system that needed to handle all paraphrases (as traditional systems must), context-free grammars are unacceptable. They do not have enough power to characterize a fragment of natural language that is very large. However, for a system that only needs to characterize one way of saying things, context-free grammars are adequate. So, for our system, the sacrifice is not very great. Additionally, a parser that could process input using augmented context-free grammars would necessarily be slower than the parser we employ. Thus, this "sacrifice" actually results in our system being able to parse faster.

The prototype is currently implemented on an LMI Lisp Machine. It employs the algorithm described above and uses the Lisp Machine's software for creating the menus required and manipulating them as described above. The prototype implementation is a natural language database query system which accesses the parts-suppliers database described in Date (1975), p. 79. This database is stored in relational form in a relational database management system that was implemented on the Lisp Machine. The Lisp code (Lisp machine) for the parser and for the construction and manipulation of the menus is included in the attached Appendix. The grammar which characterizes the allowed queries to the database is also included.

The items displayed on the menu to the user, and which can be selected by the user, need not be only words or phrases. The user can be offered inputs such as words, phrases, numbers (either unconstrained, or constrained), direct typed input (e.g. to add a new entry to a database), direct graphics input (e.g. by indicating a position on a map) or other versatile possibilities. For example, the items displayed will typically include such entries as "(specific part no)"or "(specific supplier)". When the user mouses one of these, he is then presented, in a little window, with a list of the names of specific suppliers, which is gathered from the database in real time. Thus, these non-word items displayed on the menu add a great deal of versatility and user convenes to this system.

These versatile displayed items are referred to generally as "experts". The implementation of these experts, once their function has been defined, is quite simple. the critical part which should be noted is that, in translation from a partial parse to a list of displayed items, the lexicon must be modified to generate non-word items at this point. Thus, for example, when the partial parse of the instant sentence entry requires that the next word entered be either an adjective or a noun, a pseudo-lexical entry for the appropriate expert item must be added if the expert item is to be displayed, in addition to entries in the lexicon which might class Jones brothers as a "noun-supplier", an additional entry to class the expert item "(specific supplier)" as a "noun-supplier" must also be added. Note that, once the expert item has been designated by the user, this designation can merely operate as a call to the expert subroutine. In addition, the use of experts does not affect the final translation of the natural language input into machine commands, since each expert concludes its function and retires immediately before the next word is selected. That is, where, e.g., a map is provided to the user, and the user moves the pointer to select a specific latitude and longitude on the map, the entry which will appear in the partial sentence being parsed would be something like "whose latitude is 50° west and whose longitude is 40° north".

In addition, where a very large number of items can be chosen from next, an expert can be used to display subcategories of the possible next items. Experts can also be used to remind the user of limitations in the database. For example, in a parts database, if every part has a weight less than five pounds, an expert for part weight can be used which constrains the numerical part weight input to be less than five pounds.

The experts can also serve as a convenient assist for the user's memory, so that, for example, where the user of a baseball statistics database cannot remember how to spell "Yastrzemski", he can simply call up an alphabetical list of players, or simply a list of players on the appropriate team. Thus, the expert if effect permits sub-queries to the database to be transacted in the midst of formulating a larger query, and thus save much time. In addition, the expert can be used, e.g., to select another input channel. For example, if a peripheral system accessory included electronic output from a scale, an expert item in a parts database could be indicated as "(specific weight read from scale #7)".

As noted, the presently preferred method of user presentation is a CRT screen, on which the various menus are displayed, together with a mouse which moves a curser on the screen. However, as is obvious to those skilled in the art, a wide variety of other actual I/O devices can be used. For example, a flat graphics display (e.g. electroluminescent) could be used instead of a CRT, and user control of the curser could be accomplished, e.g., by a joystick or by voice recognition.

The appearance of the natural language menus to the software user will now be discussed in detail, with relation to the figures.

FIG. 1 shows a sample menu as initially presented to the user. Note that the arrow seen in the middle of the blank space at the bottom indicates the position of a cursor. This cursor is controlled by a mouse. A previous query can be seen above the blank space where the cursor is found.

A new query will now be constructed. As seen in Figures 1, the only initially active window of the menus is the menu at the upper left, which permits "find", "delete", or "insert" as the initial word of a command. By moving the mouse to one of these words, for example "find", and depressing a button on the mouse, one of the possible entries is selected.

As shown in FIG. 2, a different window or windows will now be highlighted, and the selection process continues as shown in the following figures.

As selection proceeds, not only does the set of active windows change, but also the contents of each window changes. This is merely a graphic expedient to clearly present the set of active items to the user, and many other graphic presentation formats could be used instead.

Note that FIG. 3 a parenthesis has been selected as one of the items. By this means, queries having greater logical structure can be unambiguously indicated by the operator. Note also that, as shown in FIG. 3, only the attributes which could properly apply to a batter are highlighted and available for selection.

In FIG. 4, note that an expert item appears under attributes, that is the item "(specific batter teams)". When this item is moused, a pop-up expert window appears (FIG. 5), with a menu of specific batter-team attributes which can be selected. (The list of Houston and Texas is short, due to the limited extent of the actual database supported by the example shown in these pictures.) Note also that the pop-up window also contains two commands for "abort" and "do it." When one of the entries in the pop-up window is selected, the window function is not terminated until one of these commands is moused, or until some overriding command is moused. After the execute command in the pop-up expert window has been announced, the pop-up window goes away, and the expert performs its function. Note that the output of this expert into the sentence being parsed, is merely the sentence element "Houston". (FIG. 6) That is, the expert has no further effect on the sentence structure being parsed after it has performed its function.

In FIG. 7, note that numerical comparison operators can be selected.

The pop-up number expert in FIG. 8 permits a numerical input to be selected by mousing, rather than by keyboard input. Of course, the expert can also be adapted to permit direct keyboard input.

Note that the expression input would not be well-formed if a sufficient number of right parenthesis had not been entered. The way in which the system enforces this constraint is that the execute option is not presented to the user until a well-formed expression (i.e. an expression which can be parsed as a complete sentence) has been presented. Note that the command window in FIG. 8 does not contain the execute command, unlike the command window in FIG. 9.

When a well-formed sentence has been entered, the show query command and execute commands appear. The show query command can be used to immediately display the translation of the entered request. When the execute command is moused, the database system executes the access command. Note that, in the presently preferred embodiment, another pop-up window is used to provide the user with options regarding the format of the output presentation.

The save-query command, if moused, will save the query just executed for future execution of modification. The retrieve-query command can then be used, at a later point, to retrieve a previously stored query. The delete-query ("DLT. Q's") command deletes a previously stored query. The refreshed command is not currently used. The play query command is a demonstration command, which will play any saved query back in slow motion, as if it were being entered by the user.

The rub out comment deletes the last entry. This capability, as noted above, is due to the procedure of storing partially completed parses on the beta and gamma stacks. Thus, for example, if a user inputs a question with an error in it, the question can be edited using the rub out command.

Another editing capability is the following: certain items the sentence constructed are "mouse-sensitive", i.e. when the mouse is moved near a mouse-sensitive item the mouse-sensitive item suddenly appears boxed. In the presently preferred embodiment, every word or piece of data which has been input with an expert remains mouse-sensitive, and when such a mouse-sensitive piece of data is later moused, the expert reappears, and that piece of data can then be edited anew.

An example of the user-appearance after an ambiguous query is shown in FIGS. 13 and 14. After the user attempts to execute the ambiguous query, a display indicating the possible alternative parses is shown to the user, and the user is required to select one of the parses. The parse thus selected is then executed. The very small grammars which can be used in practicing natural language interface systems according to the present invention have a further advantage that ambiguously parsed inputs can easily be identified, and the ambiguity can itself be explicated and resolved as just described.

The presently preferred embodiment also includes a help function. The help function is activated by moving the cursor to a specific item on an active menu and depressing the help button, rather than the activate button, on the mouse. When this is done while the cursor is on an active item on the menu, the help expert pops up. (FIG. 15) This expert gives the user a help message, together with a list of all things which could possibly come after the item on which the curser is currently resting. If the help button is pressed while the curser is on an inactive portion of the menu, the user is presented merely with the help message, since no item can follow an inactive item.

The menu approach to natural language input has many advantages over the traditional typing approach. As mentioned earlier, every sentence that is input is understood. Thus, a 100% success rate for queries input is achieved.

Implementation time is greatly decreased because the grammars required can be much smaller, and it is the task of writing a thorough grammer for each application of a natural language understanding system that generally requires much time. Note that the reason larger grammars are not needed is because in traditional systems, every possible paraphrase of a sentence must be understood. The grammar required for this kind of linguistic coverage is quite large. In a menu-based system, only one paraphrase is needed. The user will be guided to this paraphrase by the menus.

The fact that the menu-based natural language understanding systems guide the user to the input he desires is also beneficial for two other reasons. Firstly, confused users who do not know how to formulate their input need not compose their input with no help. They only need to recognize their input by looking at the menus. They need not formulate their input in a vacuum. Secondly, the limitations of the system's conceptual coverage will be apparent. The user will immediately know what the system knows about and what it does not know about.

In addition to speeding up implementation time, parsing can be done faster as well. Two factors are responsible for this: first, the word by word parse and second, the smaller grammars. Note that parse time is in general a function of grammar size so the smaller the grammar, the faster the parse will be performed.

A final advantage is that users need not know how to type.

The application of menu-based natural language for which an implementation has been done is a natural language database query system. There are many, many other potential applications. Below, we list a few that we have thought of. However, virtually any computer system for which a natural language interface would be appropriate would benefit from menu-based natural language input.

i. Language Translator: Allow users to construct sentences using the natural language menu-based input. Since we can greatly restrict the class of sentences they are able to input with menu-based natural language, it will be possible to use relatively straightforward techniques to translate the input. A speech synthesizer could be added to the system and could actually say the translated sentence. Two such devices, one that translates language X to language Y and one that translates language Y to language X could enable two people who did not speach each others language to carry on a conversation.

ii. Speech Aid for Handicapped People: A much enhanced version of the VOCAID could be made. A person who cannot talk, write or type but who could choose an item from a menu (by pointing with a mouse or some other pointing device) could build a sentence using the menu system. Once a sentence is constructed, it could be said by a speech synthesizer. It will have a lot more capability than the VOCAID because a wide range of sentences could be constructed, rather than just a limited number corresponding to the provided templates.

Thus, the present invention provides a method whereby natural language inputs can be limited to any restricted set of inputs, as long as the restricted set of inputs can be formally described by a context-free grammar (subject to minor limitations). The present invention is a pioneer invention in the area of computer systems capable of understanding natural language inputs, and accordingly has a tremendous scope of applications. The present application has not attempted to delimit the full scope of possible applications, since the scope of applications of this pioneer invention is vast, and certainly includes a large number of subareas of application which have not been thought of. Thus, the scope of the present invention is subject to many modifications and variations, and is expressly not limited except as recited in the claims.

APPENDIX

The description of the present invention incorporates the attached appendix, which provides a listing of the LISP code which is used, in practicing the presently preferred embodiment of the invention, to run on a LMI LISP Machine using System 78.64 and microcode 843(in LISP Machine LISP), and includes a sample grammar and lexicon as actually used in the presently preferred embodiment.

What is claimed is:

1. An interface system for providing formally constrained outputs to a computing system in accordance with natural language inputs in a predefined natural language subset, which has a predefined correspondence to said formally constrained outputs, received from an unskilled user, comprising:

output means, for indicating to said user a set of permissible items;

designating means, for designating, under control of said user, a particular item from among those indicated by said output means;

parsing means coupled to said output means and to said designating means, for cumulatively parsing natural language inputs in a form of sequences of items successively designated by said user through said designating means, and for repeatedly generating and indicating on said output means all permissible items which could immediately follow the currently received sequence of items in accordance with said predefined natural language subset; and means coupled to said parsing means for translating the completed input into an executable machine command, in accordance with said predefined correspondence.

2. An interface system, for interactively, extracting natural language inputs from an unskilled user, said system comprising:

output means, for indicating to said user a set of permissible items;

designating means, for designating, under control of said user, a particular item from among those indicated by said output means;

parsing means coupled to said output means and to said designating means, for cumulatively parsing natural language inputs in a form of sequences of items successively designated by said user through said designating means, and for repeatedly generating and indicating on said output means all permissible items which could immediately follow a currently received sequence of items in accordance with a predefined natural language subset; and means coupled to said parsing means for translating the completed input into an executable machine command.

3. A method for providing executable machine commands to a computer system in accordance with natural language inputs in a predefined natural language subset which has a predefined correspondence to a set of executable machine commands, received from an unskilled user, comprising the steps of:

presenting to the user the set of permissible next inputs, which can provide a next word in a permissible natural-language input;

repeatedly, as soon as the user designates one of the permissible next inputs presented, cumulatively parsing all words in a current sequence which have been entered by said user, and displaying to said user the set of all possible next words which could form a continuation of a legal input, in accordance with said predefined natural language subset, whereby said unskilled user's choices are constrained to include selection of only legal successive sentence elements, until said user has entered a completed sentence;

and then translating said completed sentence into executable machine commands, in accordance with said correspondence therebetween.

4. The method of claim 3, wherein said predefined natural language subset is defined as a context-free grammar and a lexicon.

5. The method of claim 3, further comprising the additional substep, after said user has entered a completed sentence but before said completed sentence in translated into executable machine commands, of:

checking said completed sentence, to ascertain whether more than one legal parse of said completed sentence exists, and displaying alternative parses of said sentence to said user for choice therebetween;

and then translating said completed sentence into executable machine commands, in accordance with the one of said alternative parses which has been selected by said user.

6. The method of claim 4, wherein said grammar is a semantic grammar.

7. The method of claim 3, wherein said commands comprise database information retrieval commands.

8. The method of claim 3, wherein some permissible next inputs presented in said presenting step each represent a set of related elements, and further comprising the step of:

when a permissible next input is selected which represents a set of related elements, executing a procedure which allows the user to select one of the related elements, wherein a procedure returns the selected element as the next input selected by the user.

9. The method of claim 3, wherein possible inputs are presented to the user in multiple windows on a display output, and wherein the set of permissible next inputs is differentiated from any remaining possible inputs.

10. The method of claim 9, wherein the set of permissible next inputs is differentiated by highlighting the windows which contain them.

11. A user interface for a computer system, comprising:

an input device operable by a user;

a display readable by the user;

a processor coupled to said input device and to said display for accepting input from said input device and providing output to said display, wherein the user is constrained to enter only sentence elements which, when combined with any previous entries, generate valid substrings of a preselected language.

12. The interface of claim 11, where the preselected language is a subset of natural language.

13. The inferface of claim 11, wherein, after a valid complete sentence according to the language has been input, if the sentence is ambiguous according to the preselected language, such is indicated on the display and the user is allowed to select an intended meaning of the sentence.

14. The interface of claim 11, wherein the processor determines a set of valid next inputs according to a current partial input string as constrained by the preselected language, and wherein the user is allowed to enter only an element which is in such set of valid next inputs.

15. The interface of claim 14, wherein the set of valid next inputs is presented on said display, and wherein the user selects an input from those presented.

16. The interface of claim 15, wherein the set of valid next inputs is presented as at least one menu.

17. The interface of claim 15, wherein inputs which are not contained in the set of valid next inputs are also presented on said display, and wherein the set of valid next inputs is differentiated from those not in the set.

18. The interface of claim 17, wherein the set of valid next inputs is highlighted.

19. The interface of claim 11, wherein some of the sentence elements which generate a valid substring have common attributes allowing them to be grouped in a class, wherein a single identifier designates the class, and wherein, upon entry of the single identifier by the user, a procedure is initiated which assists the user in selecting a particular sentence element, wherein the particular sentence element selected by the user is returned to said processor as a next entered sentence element.

20. The interface of claim 11, wherein the preselected language is defined by a grammar.

21. The interface of claim 11, further comprising:
   a translator coupled to said processor for translating input sentences of the preselected language into a target language.

22. The interface of claim 21, wherein the target language is a database query language.

23. An interface for a computer system, comprising:
   an input operable by a user;
   a display readable by the user;
   a grammar defining a language of allowable input strings;
   a processor coupled to said input, display, and grammar, wherein said processor determines, based on any current partial input strings, all valid next entries according to said grammar, and allows the user to enter in said input only entries which are valid next entries.

24. The interface of claim 23, wherein the grammar is a syntactically constrained grammar.

25. The interface of claim 24, wherein the grammar is a context free grammar.

26. The interface of claim 24, wherein the grammar is a semantic grammar.

27. The interface of claim 24, wherein the grammar is a regular grammar.

28. The interface of claim 24, wherein the grammar is an attributed grammar having attributes.

29. The interface of claim 28, wherein the attributes of the grammar are attributes of linguistic variables.

30. A method for accepting input entered into a computer system by a user, comprising the steps of:
   (a) providing a language defining valid input sentences;
   (b) constraining inputs which can be entered by the user to those which are valid next entries according to the language;
   (c) accepting an input from the user;
   (d) repeating steps (b) through (c) until a final valid sentence has been entered.

31. The method of claim 30, wherein the language provided is a subset of natural language.

32. The method of claim 30, further comprising:
   (e) after step (d), if the final valid sentence is ambiguous, allowing the user to select a correct interpretation of the entered sentence.

33. The method of claim 32, wherein step (e) comprises:
   (e.1) determining whether the final valid sentence is ambiguous;
   (e.2) if the final valid sentence is ambiguous, displaying alternative interpretations to the user;
   (e.3) accepting from the user an input indicating which alternative interpretation of the ambiguous sentence is desired.

34. The method of claim 30, wherein step (b) comprises:

(b.1) predicting all valid next inputs based on inputs already entered by the user, according to the language;
   (b.2) indicating to the user a set of all valid next inputs.

35. The method of claim 34, wherein the set of all valid next inputs is presented to the user as a menu.

36. The method of claim 34, wherein a plurality of possible next inputs are presented to the user on a display, and wherein the set of valid next inputs is differentiated from those possible inputs which are ont in such set.

37. The method of claim 30, wherein possible inputs having a common attribute are considered as a class, wherein the user can select the class as an input, and wherein selection of the class initiates execution of a procedure comprising the steps of:
   (f) guiding the user to enter an input within the class; and
   (g) returning an entered input as the input to be accepted in step (c).

38. The method of claim 37, wherein step (f) comprises the steps of:
   (f.1) displaying all possible inputs within the class.

39. The method of claim 37, wherein step (f) comprises the steps of:
   (f.1) displaying attributes of the class to the user;
   (f.2) accepting an input from the user; and
   (f.3) repeating step (f.2) until the user enters an input within the class as defined by its attributes.

40. The method of claim 30, wherein the valid next entries in step (b) are defined by a grammar.

41. The method of claim 30, further comprising the step of:
   (h) generating an output indicating contents of the final valid sentence.

42. The method of claim 41, wherein the output is a valid string of a second language.

43. The method of claim 42, wherein the second language is a database query language.

44. A method for accepting input entered into a computer system by a user, comprising the steps of:
   (a) providing a grammar which defines a language;
   (b) predicting a set of valid next inputs, based on any current partial sentences, according to the language;
   (c) displaying the set of valid next inputs to the user;
   (d) accepting a selection of a valid next input from the user and adding it to a current partial sentence;
   (e) repeating steps (a) through (c) until a sentence within the language is generated.

45. The method of claim 44, wherein the grammar provided in step (a) is a syntactically constrained grammar.

46. The method of claim 45, wherein the grammar is context free.

47. The method of claim 45, wherein the grammar is a semantic grammar.

48. The method of claim 45, wherein the grammar is regular.

49. The method of claim 45, wherein the grammar is an attributed having attributes.

50. The method of claim 49, wherein the attributes of the language are attributes of linguistic variables.

51. An interface system for providing constrained outputs to a computing system in accordance with inputs received from a user in a language, the inputs having a predefined correspondence to the outputs, comprising:

an output for indicating to the user a set of permissible items;

designating means for allowing the user to designate a particular item from among those indicated by said output;

a recognizer, coupled to said output and to said designating means, for cumulatively parsing inputs as sequences of items successively entered, and for repeatedly generating all permissible items which could immediately follow a currently received sequence of items in accordance with the language.

52. The system of claim 51, further comprising a translator coupled to said recognizer for translating a completed input into an output according to the predefined correspondence.

53. A method for providing commands to a computer system in accordance with an input language having a predetermined correspondence to the comands, comprising the steps of:

(a) presenting to a user a set of permissible next inputs according to the input language;

(b) repeatedly, as soon as the user selects one of the permissible inputs, incrementally parsing such selected input based on any previously entered words in a current sequence, and presenting to the user a set of all possible next words which could form a continuation of a legal input according to the input language, whereby choices of the user are constrained to include selection of only legal successive sentence elements, until the user has entered a complete sentence.

54. The method of claim 53, further comprising the step of:

(c) translating a parse of the complete sentence into commands for the computer system.

* * * * *